(12) United States Patent
Feinberg et al.

(10) Patent No.: US 9,571,428 B2
(45) Date of Patent: Feb. 14, 2017

(54) RECEIVING AND PRESENTING DETAILED ACTIVITY INFORMATION REGARDING CURRENT AND RECENT INSTANT MESSAGING SESSIONS OF REMOTE USERS

(71) Applicant: Rakuten, Inc., Tokyo (JP)

(72) Inventors: Jonathan Feinberg, Medford, MA (US); Paul B. Moody, Mountain View, CA (US); Daniel M. Gruen, Newton, MA (US); Richard M. Wilson, Dover, NH (US)

(73) Assignee: RAKUTEN, INC., Tokyo (JP)

( * ) Notice: Subject to any disclaimer, the term of this patent is extended or adjusted under 35 U.S.C. 154(b) by 506 days.

(21) Appl. No.: 13/869,360

(22) Filed: Apr. 24, 2013

(65) Prior Publication Data
US 2013/0239021 A1 Sep. 12, 2013

Related U.S. Application Data

(63) Continuation of application No. 13/475,961, filed on May 19, 2012, now Pat. No. 8,438,490, and a continuation of application No. 10/762,427, filed on Jan. 22, 2004, now Pat. No. 8,214,749.

(51) Int. Cl.
| | |
|---|---|
| *G06F 3/00* | (2006.01) |
| *H04L 12/58* | (2006.01) |
| *G06F 11/30* | (2006.01) |
| *G06F 11/32* | (2006.01) |
| *G06F 11/34* | (2006.01) |

(52) U.S. Cl.
CPC .............. *H04L 51/04* (2013.01); *G06F 11/302* (2013.01); *G06F 11/3055* (2013.01); *G06F 11/323* (2013.01); *G06F 11/3438* (2013.01); *G06F 11/3466* (2013.01)

(58) Field of Classification Search
CPC .... G06F 11/3438; G06F 11/3466; H04L 51/04
USPC ......................................... 715/753, 758, 751
See application file for complete search history.

(56) References Cited

U.S. PATENT DOCUMENTS

| | | | |
|---|---|---|---|
| 5,793,365 A | 8/1998 | Tang et al. | |
| 5,960,173 A | 9/1999 | Tang et al. | |
| 5,990,887 A | 11/1999 | Redpath et al. | |
| 6,212,548 B1 * | 4/2001 | DeSimone et al. | ........... 709/204 |
| 6,346,952 B1 | 2/2002 | Shtivelman | |
| 6,349,327 B1 | 2/2002 | Tang et al. | |
| 6,434,599 B1 | 8/2002 | Porter | |

(Continued)

OTHER PUBLICATIONS

Tang et al., ConNexus: Instant Messaging for the Workplace, Sun Microsystems Laboratories Report, Apr. 2000.

*Primary Examiner* — Omar Abdul-Ali
(74) *Attorney, Agent, or Firm* — Hubbs, Enatsky & Inoue PLLC

(57) ABSTRACT

A system for providing a local computer user with detailed activity information regarding remote users, in order to assist the local user in determining whether to initiate a communication session with a remote user. The system provides activity information that may describe the number of instant messaging sessions one or more remote users are currently involved in, the identities of participants in those sessions, activity levels, time period information, and other information. The system further provides detailed activity information describing recent instant messaging sessions of one or more remote users.

14 Claims, 25 Drawing Sheets

(56) References Cited

U.S. PATENT DOCUMENTS

| | | | |
|---|---|---|---|
| 6,631,412 B1 | 10/2003 | Glasser et al. | |
| 6,697,840 B1* | 2/2004 | Godefroid et al. | 709/205 |
| 7,124,372 B2 | 10/2006 | Brin | |
| 7,127,685 B2* | 10/2006 | Canfield et al. | 715/842 |
| 7,139,797 B1* | 11/2006 | Yoakum et al. | 709/204 |
| 7,181,492 B2 | 2/2007 | Wen et al. | |
| 7,216,147 B2* | 5/2007 | Blagsvedt et al. | 709/206 |
| 7,225,226 B2* | 5/2007 | Fitzpatrick et al. | 709/205 |
| 7,275,215 B2* | 9/2007 | Werndorfer et al. | 715/752 |
| 7,284,033 B2* | 10/2007 | Jhanji | 709/206 |
| 7,310,733 B1* | 12/2007 | Pearson et al. | 713/185 |
| 7,640,293 B2* | 12/2009 | Wilson et al. | 709/203 |
| 7,747,957 B2* | 6/2010 | Masuda | 715/753 |
| 8,160,912 B2* | 4/2012 | Denner et al. | 705/7.19 |
| 2001/0025280 A1 | 9/2001 | Mandato et al. | |
| 2002/0165898 A1* | 11/2002 | Duffy et al. | 709/102 |
| 2003/0101343 A1* | 5/2003 | Eaton et al. | 713/170 |
| 2003/0212746 A1* | 11/2003 | Fitzpatrick et al. | 709/206 |
| 2004/0015547 A1* | 1/2004 | Griffin et al. | 709/204 |
| 2004/0015548 A1* | 1/2004 | Lee | 709/204 |
| 2005/0021624 A1* | 1/2005 | Herf et al. | 709/204 |
| 2005/0132288 A1* | 6/2005 | Kirn et al. | 715/700 |
| 2005/0166154 A1* | 7/2005 | Wilson et al. | 715/751 |
| 2006/0064646 A1* | 3/2006 | Kelso et al. | 715/772 |
| 2006/0085515 A1* | 4/2006 | Kurtz et al. | 709/207 |
| 2006/0159253 A1 | 7/2006 | Fink et al. | |
| 2008/0052354 A1* | 2/2008 | Barber-Mingo et al. | 709/204 |
| 2011/0078590 A1* | 3/2011 | Hao et al. | 715/755 |
| 2011/0288962 A1* | 11/2011 | Rankin et al. | 705/27.1 |
| 2012/0124150 A1* | 5/2012 | Ge et al. | 709/206 |

* cited by examiner

| Personal Address Book | | | |
|---|---|---|---|
| Add Contact    Add Group    Compose Message    Refresh    Delete | | | |
| Show: People and groups ▶   a b c d e f g h i j k l m n o p q r s t u v w x y z ▼▲ | | | |
| Name ∧ | Phone | Primary E-mail | Company |
| ☐ Sales Support | | | |
| • Schultz, Andrea | Work: 212-635-3367 | aschutz@lawyers.com | Austin, Hadley & Norris |
| ◇ Shaheen, Cynthia | Work: 212-635-3335 | cshah@lawyers.com | Austin, Hadley & Norris |
| ☐ Smith, Frank | Work: 212-635-3332 | fsmith@lawyers.com | Austin, Hadley & Norris |
| ☐ Turner, Rob | Work: 250-632-9090 | robt@vanpartners.com | Vancouver Partners |
| ☐ Duffy, Pat | Work: 623-952-1128 | pduffy@yourco.com | YourCo Ltd. |
| ⊘ Jacobs, Jan | Work: 617-331-9943 | janj@metrotimes.com | Metro Times |
| • Schultz, Andrea | Work: 212-635-3367 | aschutz@lawyers.com | Austin, Hadley & Norris |
| ☑ Seller, Chris | Work: 212-972-3341 | cseller@rightware.com | Rightware, Inc. |
| ◇ Shaheen, Cynthia | Work: 212-635-3335 | cshah@lawyers.com | Austin, Hadley & Norris |
| ☐ Smith, Frank | Work: 212-635-3332 | fsmith@lawyers.com | Austin, Hadley & Norris |
| ☐ Turner, Rob | Work: 250-631-9990 | robt@vanpartners.com | Vancouver Partners |
| a b c d e f g h i j k l m n o p q r s t u v w x y z | | | |

*FIG. 4*

RECEIVING AND PRESENTING DETAILED ACTIVITY INFORMATION REGARDING CURRENT AND RECENT INSTANT MESSAGING SESSIONS OF REMOTE USERS

FIELD OF THE INVENTION

The disclosed system relates generally to messaging and collaboration software systems, and more specifically to a method and system for sensing and reporting activities regarding open instant messaging windows of remote users.

BACKGROUND OF THE INVENTION

In existing computer software systems, a category of software applications sometimes referred to as "presence technology" enables users to view or obtain indications of the on-line status of other users. The on-line status indications provided by existing systems indicate the current availability of remote users for real-time communication sessions. Instant messaging (IM) systems are a popular example of presence technology. Instant messaging systems are typically client-server software, in which a client application program executes on a local user's hardware system, in cooperation with one or more associated server programs, typically executing on one or more remote server computer systems. Many instant messaging systems enable a user to define a "buddy list", consisting of a list of colleagues, workgroup members, friends, etc., that the user wishes to communicate with via the instant messaging application. An instant messaging communication session or dialog involving two or more users is sometimes referred to as a "chat" session.

Existing instant messaging client software enables a local user to determine if one or more remote users in his or her buddy list are currently engaged in any instant messaging chat sessions. For example, an interface described in U.S. Pat. No. 5,793,365 of Tang et al. provides a local user with activity information regarding another user, such as a user in the local user's workgroup. However, such existing systems are limited in their specific capabilities. Significantly, existing systems do not enable a local user to determine the number of chat sessions another user is currently engaged in, or the other user's activity level in any such current chat sessions. It would be desirable to have access to such detailed current activity information, since knowing that a person is currently highly active in a relatively large number of active chat sessions may be a good indication that it may not be an appropriate time to initiate an instant messaging dialog or discussion with the remote user until their activity level decreases significantly. Additionally, existing systems include no way for a local user to determine whether a remote user has been involved in any chat sessions in the recent past, or with whom the remote user has been chatting with. Such information would also be useful to the local user while using instant messaging or other types of communication systems to contact remote users.

For these reasons and others, it would be desirable to have a system that provides information to a local user regarding the number of chat sessions a remote user is involved in, and indications of the activity levels within such current chat sessions. It would further be desirable for the system to conveniently provide indications of the identities of persons that a remote user has been chatting with, and detailed information regarding chat sessions of that remote user in the recent past.

SUMMARY OF THE INVENTION

To address the problems described above and others, a system and method are disclosed that provide a local computer user with detailed activity information regarding instant messaging sessions of remote users, in order to assist the local user in determining whether to initiate a communication session with a remote user. The disclosed system provides activity information describing the number of instant messaging sessions one or more remote users are currently involved in, as well as activity levels for each of those instant messaging sessions, identities of other session participants, and/or beginning and end times of the sessions. The disclosed system provides similar detailed activity information describing recent instant messaging sessions of one or more remote users.

Activity information provided by the disclosed system for a given remote user is accessible to the local user through a graphical object associated with that remote user, such as a distinctive graphical representation of the remote user's name. The graphical object associated with the remote user may be presented as an awareness object either within a visual context of the awareness client program, or within the visual context of an application program external to the awareness client program. The client program operates to register with one or more server programs to receive information regarding remote users associated with graphical objects in a current visual context on the local computer system, and/or contained within the local user's buddy list.

The detailed activity information provided by the disclosed system may be displayed in an enhanced awareness application display, either as part of an application client program display region of the graphical user interface, part of the display region of another application program executing on the local computer system, within a pop-up information window, or through some other technique. A special chat activity icon may be displayed showing within it the number of currently active chat windows for the associated remote user. A menu may be provided when the local user hovers over the icon listing the participants in current and/or recent chat sessions of the remote user, beginning or end times associated with the current or recent chat sessions of the remote user, and other information. The visual representation of the chat activity icon, such as its color, may be manipulated to indicate a level of activity in one or more of the active chat sessions. To collect activity information, an awareness client software program in the disclosed system operates to sense information regarding communication sessions on the client system, such as the current number of open chat windows, the times at which the chat windows are opened and closed, the names of users participating in the chat sessions in those chat windows, and/or keyboard and mouse activity of the remote user and arrivals of new text passages in the open chat windows. The client program reports such information to one or more awareness server programs, together with a user name associated with the client system, for access by other client programs that have registered with the server system for information regarding the associated user name. The disclosed system further enables a user to control the specific activity information provided to other users, as well as those other users to which such information may be provided.

Thus there is disclosed a system that provides detailed activity information to a local user regarding the number of instant messaging sessions a remote user is currently or was recently involved in, as well as indications of the activity levels of such current instant messaging session. The disclosed system further operates to provide identities of persons that a remote user is currently or has recently been chatting with, and/or time information regarding current instant messaging sessions of the remote user, as well as instant messaging sessions in the recent past.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 4 shows an example of a user display including awareness objects in a display window for an application other than that of the awareness application client process;

DETAILED DESCRIPTION OF EXEMPLARY EMBODIMENTS

1. Awareness Client—Server Software Application

Figure 1:
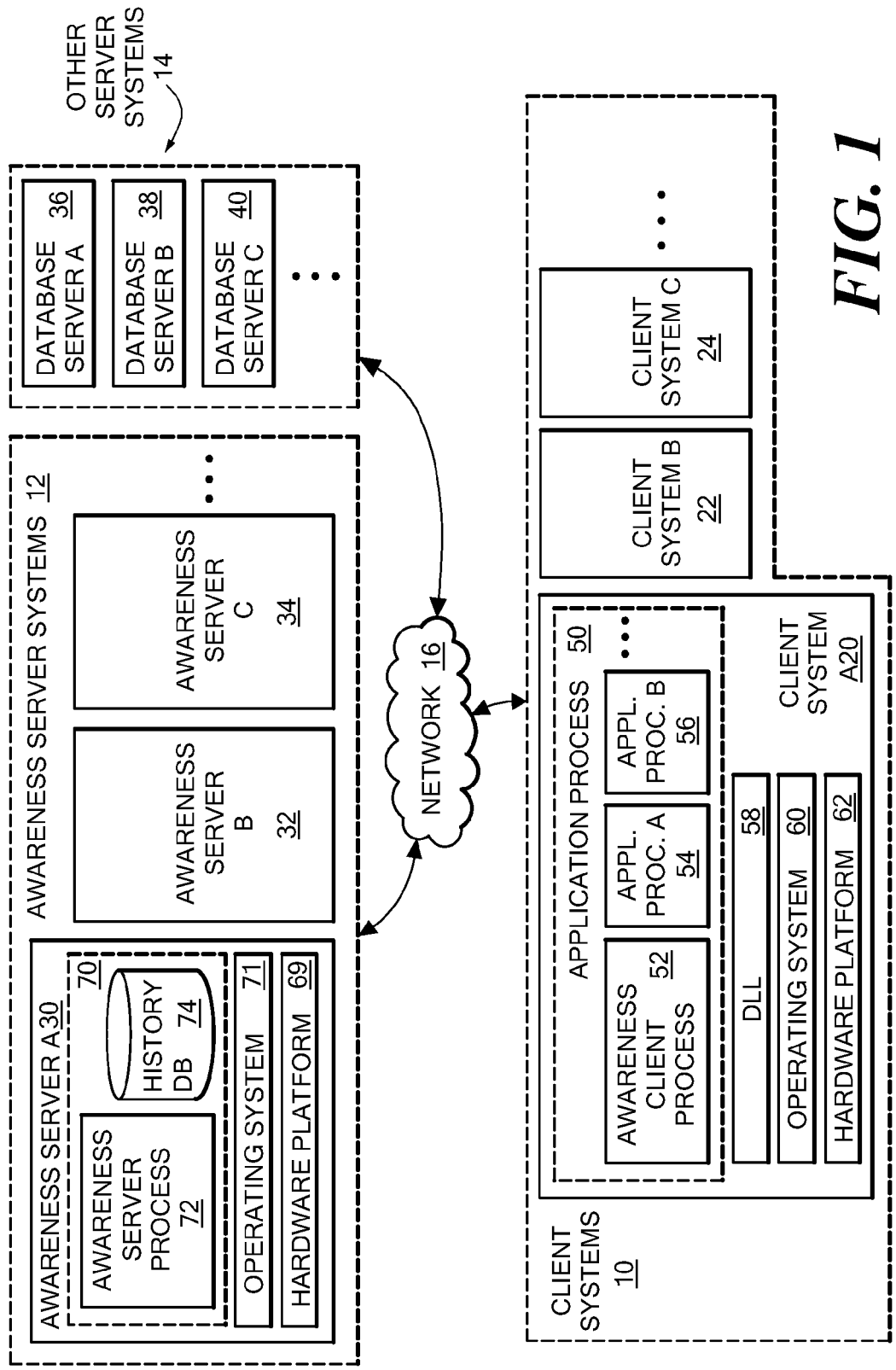
FIG. 1 is a block diagram illustrating the devices and software components used for collection of awareness information by an embodiment of the disclosed system.

As shown in FIG. 1, an execution environment for an illustrative embodiment of the disclosed system includes a number of client systems 10, awareness server systems 12, and other server systems 14, interconnected through a communications network 16 such as the Internet. The client systems 10 are shown for purposes of illustration including client system A 20, client system B 22, client system C 24, and may include any specific number of client systems. As shown for client system A 20, each of the client systems in the client systems 10 may include a hardware platform 62, an operating system 60, a dynamically linked library 58, and some number of application processes 50. The hardware platform 62 may, for example, include one or more processors communicably coupled to program storage for storing program code executable on the processors, as in a computer system, communication device, or the like. The operating system 60 may be any specific type of software operating system program capable of providing an interface to client system resources, such as hardware resources in the hardware platform 62, for use by software executing in the client system. The dynamically linked library 58 includes program code used by an awareness client process 52 to interface to other software, such as the operating system 60 and/or other application programs within the application processes 50, shown for purposes of illustration as application process 54 and application process 56.

The awareness servers 12 are shown including awareness servers A 30, B 32 and C 34, and may include any specific number of awareness server systems. As shown in awareness server A 30, each of the awareness server systems 12 may include a hardware platform 69 and operating system 71, as well as an awareness server software process 72 and a history database 74 accessible to the awareness server process 72. The other server systems 14 may include any specific number of server systems of various specific types, shown for example as database server A 36, database server B 38, and database server C 40.

During operation of the awareness client process 52 of FIG. 1, the awareness client process 52 controls the display of at least one portion of the display area in a graphical user interface display accessible to a local user of the client system. The awareness client process 52 also operates to determine the activities of other application processes within the application processes 50. Such monitoring of the activities of other application processes within the client system may, for example, be performed by the awareness client process 52 using program code in the dynamically linked library 58, and using functions provided by the operating system 60 or by other application processes. In one embodiment, the awareness client process 52 operates to monitor display windows provided for other application processes in the client system by the operating system 60 in the client system graphical user interface. Such monitoring may be performed using application programming interfaces provided by the operating system 60, or by other application programs, and allows the awareness client process 52 to obtain awareness information regarding user activities on the client system involving other applications on the client system. Such awareness information may, for example, include a description of one or more of the following with regard to the client system:

1) The names of executing application programs,
2) The total number of open display windows,
3) The number of open display windows associated with an application process,
4) The window and associated application program that has current focus for receiving inputs from the local user,
5) The keystrokes input to an application process,
6) Mouse events for each application process and/or window, such as left clicks, right clicks, hovering, text selection, etc.
7) The names of accessed documents and/or files, and the times of such accesses,
8) The names of participants in communication sessions,
9) The identity of a user that initiated a communication session,
10) The beginning and end times of a communication sessions,
11) An activity level of a communication session,
12) Any other specific type of information that may be available through a given operating system or other application process on the client system.

For example, in one embodiment of the disclosed system, for each of a number of predetermined known application types, including but not limited to: office productivity applications (i.e. word processing, spreadsheet, presentation editors, etc.), information browsing programs (Web and HTML browsers), file system applications (search, folder and directory listing applications), document management systems (database, shared document repositories, etc.), and others, the awareness client application process may use an associated method from the dynamically linked library 58, appropriate for that application type, to determine and record the names of documents being accessed and the times of such accesses.

Similarly, in another exemplary embodiment, the dynamically linked library 58 (DLL) on the client system may be used by the awareness client application process to monitor all chat session windows present in the windowing/desktop environment provided by the operating system. In this regard, the dynamically linked library 17 may be used to monitor window focus, keyboard/mouse activity, and participants for the chat session windows.

The awareness information collected by the awareness client process 52 is associated with a user name or other indication of a user of the client system, and transmitted with such user indication to one or more of the awareness servers 12. The receiving awareness server then operates to store the information as awareness information associated with that user within one or more awareness history databases, such as the history database 74 in the awareness server A 30. The awareness server process 72 in the receiving awareness server then operates to broadcast portions of the awareness information to one or more awareness client processes that have registered to receive all or some of the awareness information for the associated user.

The awareness client process 52 further operates to register to receive awareness information associated with users corresponding to one or more graphical awareness objects in the current visual context of the graphical user interface for the client system. Such awareness objects may, for example, consist of graphical representations of remote users, such as the names or images of the remote users, and/or indication that awareness information and/or awareness functionality is available with regard to those remote users. The awareness information received by an awareness client process is cached for use when responding to requests for awareness information regarding one or more remote users by a local user on the client system. Additionally, the awareness client process may obtain previously stored awareness information regarding one or more remote users through requests indicating a recent or earlier time period for which the awareness information is desired.

Further during the operation of the system shown in FIG. 1, detail information regarding one or more users may be obtained from other server systems 14. For example, detail information may be stored externally to the awareness client process and awareness server process in a corporate database within one of the other server systems 14. The network location, name and/or address of the specific database and server from which detail information is to be obtained for a given user is conveyed to or configured in one or more of the awareness server processes within the awareness servers 12. The awareness server process may operate to either obtain detail information regarding one or more users and then provide the detail information to awareness client process that have either requested the detail information, or that have registered an interest in receiving awareness information for the associated users. Alternatively, the awareness server processes may operate to provide the network location, name and/or address of the specific database and server from which detail information is to be obtained for a given user name to the awareness client processes that have requested the detail information, or that have registered an interest in receiving awareness information for that user. The awareness client processes then operate to directly obtain the detail information from the external database as needed in response to local user actions.

Figure 2:
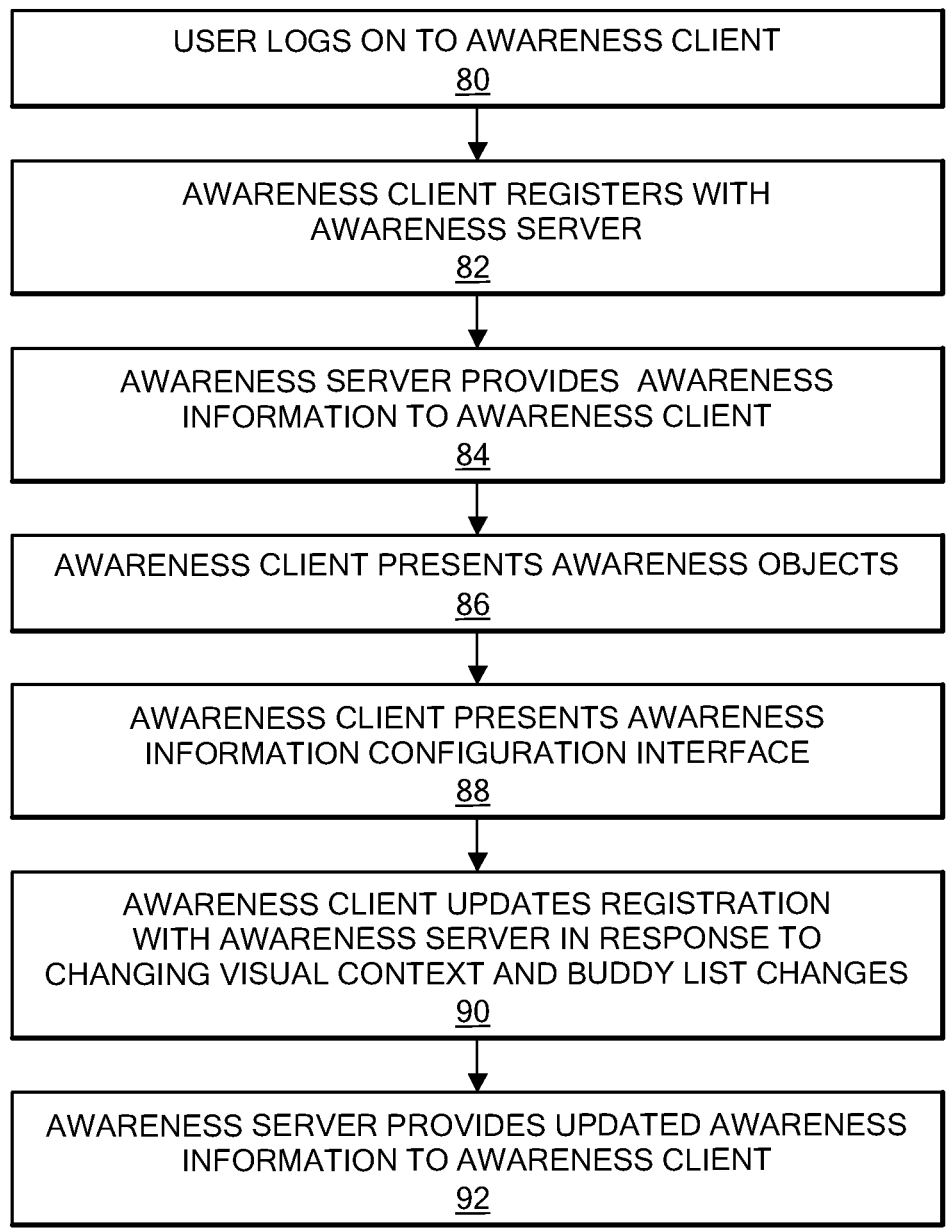
FIG. 2 is a flow chart illustrating steps performed in an embodiment of the disclosed awareness client process to register to receive awareness information regarding remote users from an awareness server process based in part on the awareness objects in a current visual context for the local user.

FIG. 2 is a flow chart illustrating steps performed in an embodiment of the disclosed system to collect and distribute awareness information used by awareness client processes executing on client systems. At step 80, a local user logs on to a client system, and the awareness client process on the client system is started. The awareness client process may initially obtain a user name and corresponding password from the local user to authenticate the local user. At step 82, the awareness client process registers with one or more awareness server processes by sending a registration message including the current on-line status of the local user, and a list of remote users for which awareness information is desired. For example, the list of remote users might include users contained in the local user's buddy list, either within the awareness client process or in an external instant messaging program, and/or some number of remote users associated with awareness objects in portions of the current user display, such as windows, associated with application processes other than the awareness client process.

At step 84 the awareness server process sends the awareness client process awareness information for the remote users in the list sent by the awareness client process. The transmission of awareness information by the awareness server process at step 84 may occur periodically, and/or responsive to explicit requests by the awareness client processes, or based on some criteria. At step 86, the awareness client process presents the local user with awareness objects indicating that awareness information and/or instant messaging or other awareness functionality is available for associated remote users. Further at step 86, the awareness client process may present all or part of a buddy list to the local user. Some or all of the remote users contained in the buddy list for the local user may have awareness information and/or functionality available for them as well.

At step 88, the awareness client process may present the local user with an interface providing the local user with the ability to see and configure specific awareness information about the local user that is available to other users. The local user can then use the interface provided at step 88 to specify the type, or edit the content, of the awareness information that is to be shared.

When the awareness client process determines that the local user may need access to awareness information for a remote user, the awareness client process updates its registration with the awareness server process at step 90. Such a determination may result from a new awareness object becoming part current visual context of the user display on the client system. Such a new awareness object may be added to portions of the graphical user interface, such as display windows, associated with and/or controlled by the awareness client process, or associated with and/or controlled by other application programs. Similarly, when an awareness object goes out of the current visual context of the user display on the client system, the awareness client process may update its registration with the awareness server process so as not to receive further awareness information for the associated remote user. In one embodiment, cooperating application processes on the client system inform the awareness client process of the awareness objects in their current user displays, and pass control of such awareness objects to the awareness client process. In this way, the awareness client process is able to keep track of which awareness objects are currently displayed throughout the entire current visual display context of the client system, both within and outside the primary portion of the user display controlled by the awareness client process. Gaining such control over the awareness objects in other applications also enables the awareness client process to receive and handle local user actions such as clicking on, hovering over, and/or selecting a given awareness object in some other way. Independent of the current visual display context, when changes are made to the local user's buddy list, such changes are similarly used to update the registration with the awareness server process to reflect the addition and deletion of remote users. At step 92, the awareness server process provides updated awareness information to the awareness client process reflecting the updated registration performed in step 90.

Figure 3:
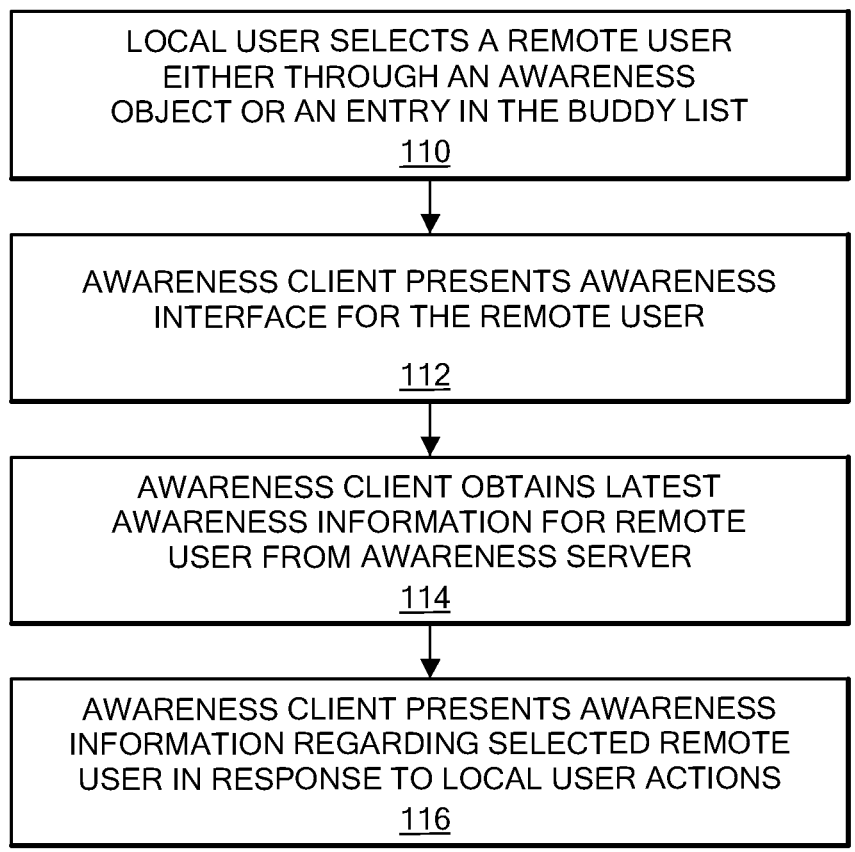
FIG. 3 is a flow chart illustrating steps performed in an embodiment of the disclosed awareness client process to present awareness information to a local user.

FIG. 3 is a flow chart showing steps performed in an illustrative embodiment to enable a local user to obtain awareness information regarding one or more remote users. At step 110, the awareness client process detects that the local user has selected a remote user. The local user may select a remote user either by selecting the remote user's name within the local user's buddy list, or by selecting an awareness object associated with the remote user. The selection may, for example, be performed by clicking on the remote user's name in the buddy list or on the awareness object associated with the remote user. As a result of the selection at step 110, the local user may be provided with a number of awareness options, as well as a display of various types of awareness information, such as detail information regarding the selected remote user, at step 112. Detail information provided at step 112 is obtained by the awareness client process originates from an external server, such as a corporate database server, and may be obtained by the awareness client process either from an awareness server process associated with the remote user, or directly from the external server using information obtained from the awareness server process. The specific detail information provided by the remote user was defined by the remote user through an awareness client process by the remote user. The initial detail information provided at step 112 may be a copy of detail information for the remote user cached in the local user's client system, received prior to selection of the remote user. At step 114, the awareness client process may further operate to obtain current awareness information for the selected remote user from the awareness client process. The awareness client process then provides the local user with specific portions of the current awareness information regarding the selected remote user at step 116.

The request for current awareness information at step 114 may, for example, be in response to selection of specific awareness operations by the local user requesting specific portions and/or types of awareness information. For example, the awareness client process may request awareness information regarding the selected remote user from a remote awareness history database at step 114. Such awareness information may include a current set of detail information, or other specific type of awareness information regarding the selected remote user, as well as previously stored versions of a specific type of awareness information the selected remote user. In addition or alternative to detail information regarding the remote user, the current and/or previously stored awareness information for the remote user may relate to and/or identify properties of chat sessions or other modes of communications performed by the remote user, applications used by the remote user, documents accessed by the remote user, status messages defined by the remote user, and/or other specific types of awareness available regarding the remote user. Such awareness information may include names of documents accessed by the remote user, the times the documents were accessed, the number of chat sessions the remote user is currently involved in and/or was recently involved in, the times of such chat sessions, the names and/or images of other users involved in chat sessions or other types of communications with the remote user, amounts of activity in a current or previous chat session, and/or other information regarding the selected remote user.

The awareness client system may operate to present awareness information in response to a local user hovering over and/or clicking on one or more predetermined display objects in an awareness client user display using a mouse pointing device. Such display objects may, for example, include some number of activity icons, each of which is associated with a type of awareness information and/or functionality. These activity icons may include a chat activity icon, a keyboard and mouse activity icon, and/or a document activity icon. The chat activity icon may represent and/or provide access to awareness information describing chat session activity of the selected remote user. The keyboard and mouse activity icon may be used to represent and/or provide access to awareness information describing keyboard and mouse pointer device activity of the selected remote user, such as left clicks, right clicks, or hovering, both within current chat sessions, and also within other applications on the client system of the selected remote user.

2. Awareness Objects

FIG. 4 shows an example of how an awareness client process may present awareness objects through another application process. As shown in FIG. 4, a personal address book application process display 160 includes a list of user entries 162. Each of the user entries 162 shows name, phone, primary e-mail, and company fields for an associated remote user. In the example of FIG. 4, the area within the name field for each of the user entries 162 is an awareness object associated with the remote user for that user entry. For example, an awareness object 163 is shown for the user "Turner, Rob", consisting of a display area including the user name of the remote user ("Turner, Rob"), as well as the online status indication for the remote user, in this case a square online status icon for the remote user "Turner, Rob". Each of the awareness objects in FIG. 4 includes an online status icon for the associated remote user. The current online state of the remote user associated with the awareness object is indicated by one of several possible on-line status icons. If a remote user is currently off-line, then no online status icon is shown in the associated awareness object. If a remote user is currently on-line and active, a square shaped on-line status icon is shown in the associated awareness object. If a remote user is currently online and away, then a diamond shaped status icon is shown in the associated awareness object. If a remote user is currently online but is not to be disturbed, then a circle with a slash shaped icon is shown in the associated awareness object. Other status icons may be used to show other types of online status, such as an icon having a predetermined shape indicating that the remote user associated with the awareness object is online and using a wireless device.

The awareness objects in the name fields of the entries in the personal address book of FIG. 4 are only one possible way to include awareness objects in a user display, and the present invention is not limited to that specific technique. Moreover, any type visual indication may be used to identify the online status of a remote user associated with and awareness object. Generally, awareness objects will include some identification of the remote user with which they are associated, such as the remote user's name, or an image or picture of the remote user. The personal address book application 160 is only one example of the various application programs in which an awareness object can be embedded. Any type of application program may pass control to the awareness client process of a portion of its display to serve as an awareness object.

When the local user clicks on one of the awareness objects shown in FIG. 4, the awareness client process provides access to awareness functionality and detail information regarding the associated remote user. For example, clicking on an awareness object may result in a pop-up window or menu through which further awareness actions could be triggered by the local user. Examples of awareness actions are further described below, and may include looking up personal information about the remote user associated with the awareness object and/or initiating a chat session with that remote user.

As shown in FIG. 4, the disclosed system presents the local user with awareness objects in the context of other work being performed by the local user. Accordingly, an awareness object may be presented within a workflow form, in a list of recently received email, in a graphical or textual representation of a remote user shown as an interaction history of another remote user, or various other contexts.

Also as shown in FIG. 4, awareness objects may be modified in their visual appearance to reflect changes in the online status of the associated remote user. Moreover, when the local user hovers over an awareness object with the cursor, a display of a status message for the associated remote user is displayed.

3. Remote User Detail Information

Figure 5:
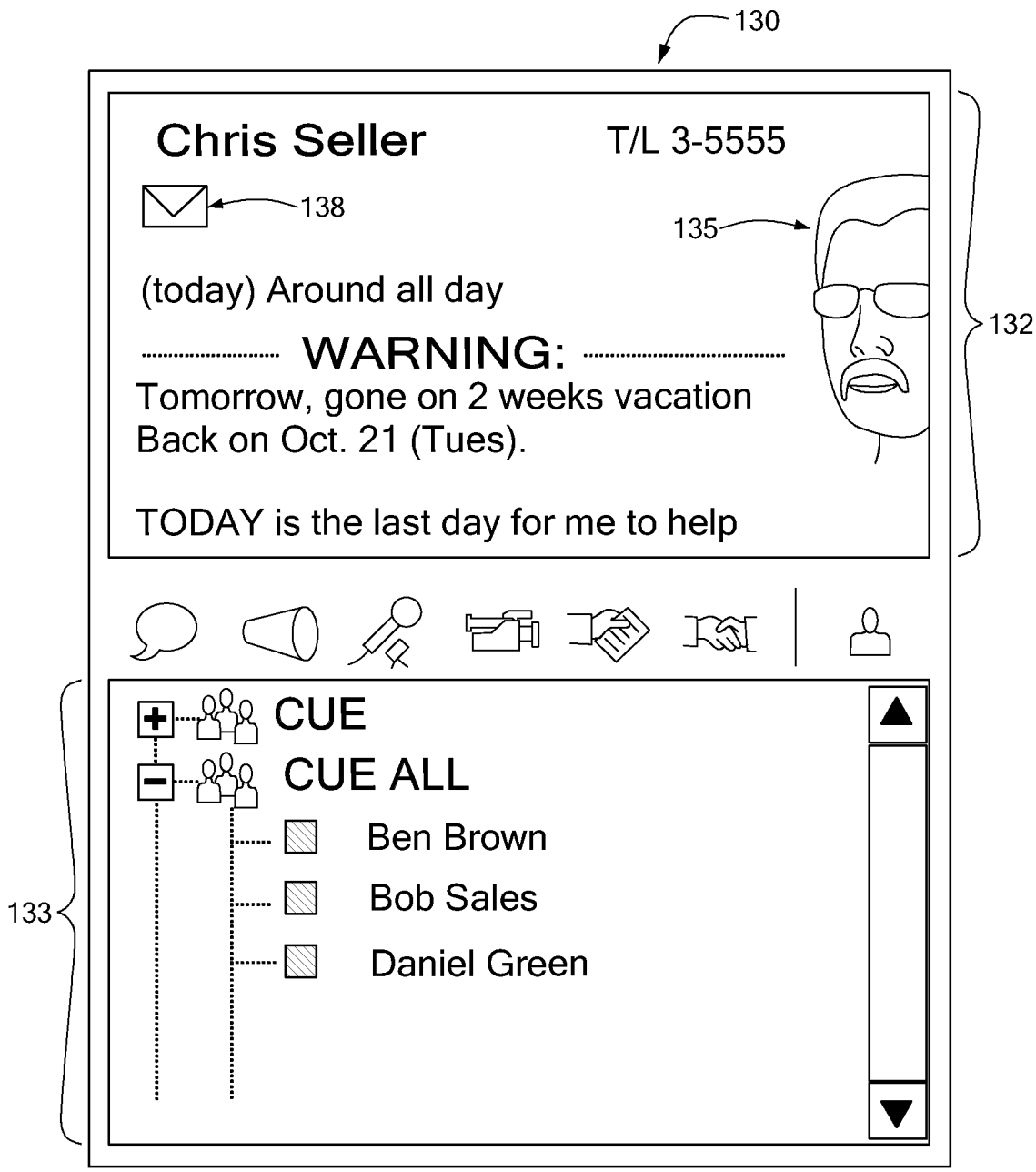
FIG. 5 shows an example of a display for presenting detail information regarding a remote user to a local user together with a buddy list provided by the awareness application client process.

The disclosed system provides detail information regarding a selected remote user, either as a result of the local user clicking on an awareness object associated with the remote user, or the local user clicking on the remote user's entry in the local user's buddy list, or through some other appropriate technique. FIG. 5 shows an example of a display provided by the awareness client process to present detail information regarding a remote user. As shown in FIG. 5, the detail information 132 may be provided in a portion of an awareness client process display 130 also including a buddy list 133. In the example of FIG. 5, the detail information 132 is for a remote user "Chris Seller", selected through an associated awareness object presented to the local user outside the awareness client process display 130. Alternatively, the detail information 132 may be presented as the result of selecting the entry for "Chris Seller" from the buddy list 133. The detail information 132 may include any specific type of information regarding the selected remote user, and the illustrative detail information 132, including an email action icon 138 and image of the remote user 135, is shown for purposes of illustration only.

Figure 6:
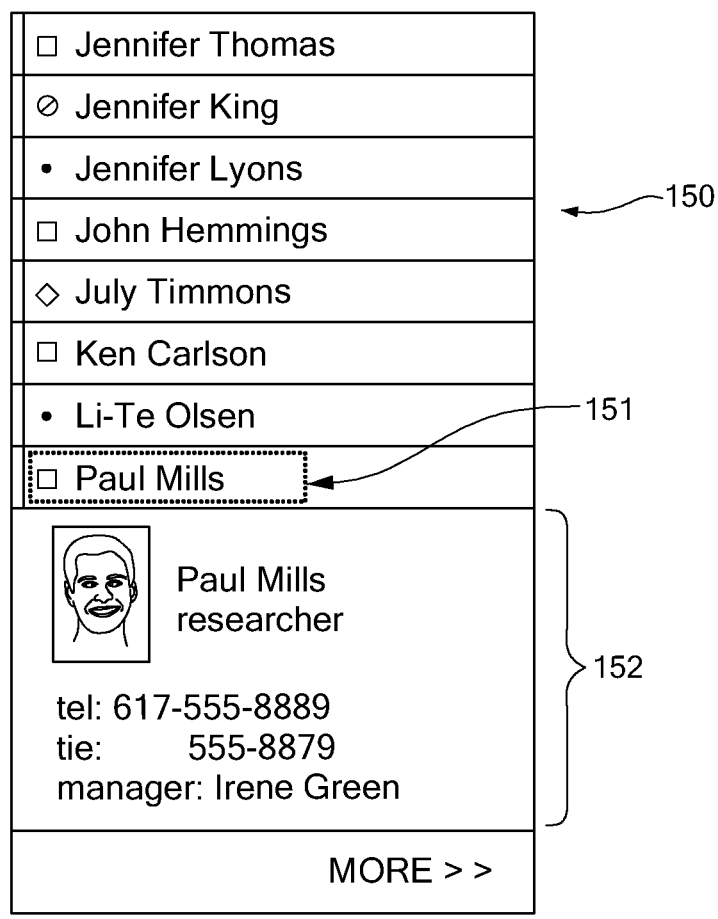
FIG. 6 shows another example of display for presenting detail information regarding a remote user to a local user.

FIG. 6 shows another example of a display for presenting detail information regarding a selected remote user. The display 150 of FIG. 6 is a buddy list in which the remote user name entry 151 for "Paul Mills" has been selected by the local user. As a result, the awareness client process has expanded the entry for the remote user "Paul Mills" to show detail information 152 associated with that remote user.

In both FIGS. 5 and 6, when the local user triggers the display of personal information regarding a remote user, the awareness client process issues one or more commands to a database server across the communications network, or to local resources on the client system, using an application programming interface (API) to a personal records database. The commands to the API request a subset of the personal record information for the remote user associated with the awareness object. The personal record information obtained in this way may include, for example, contact phone number(s), an image such as a photo of the selected remote user, address information, job role, relevant management and reporting structure information, direct reports, areas of expertise, etc. The detail information from the database is parsed by the local system, and marked up for display to the local user, either within the awareness client process display window, within the display window of another application process, within a pop-up window, or in some other fashion. The detail information presented by the awareness client may have actions associated with specific portions, such as an "initiate IP phone call" action associated with a displayed phone number.

Figure 7:
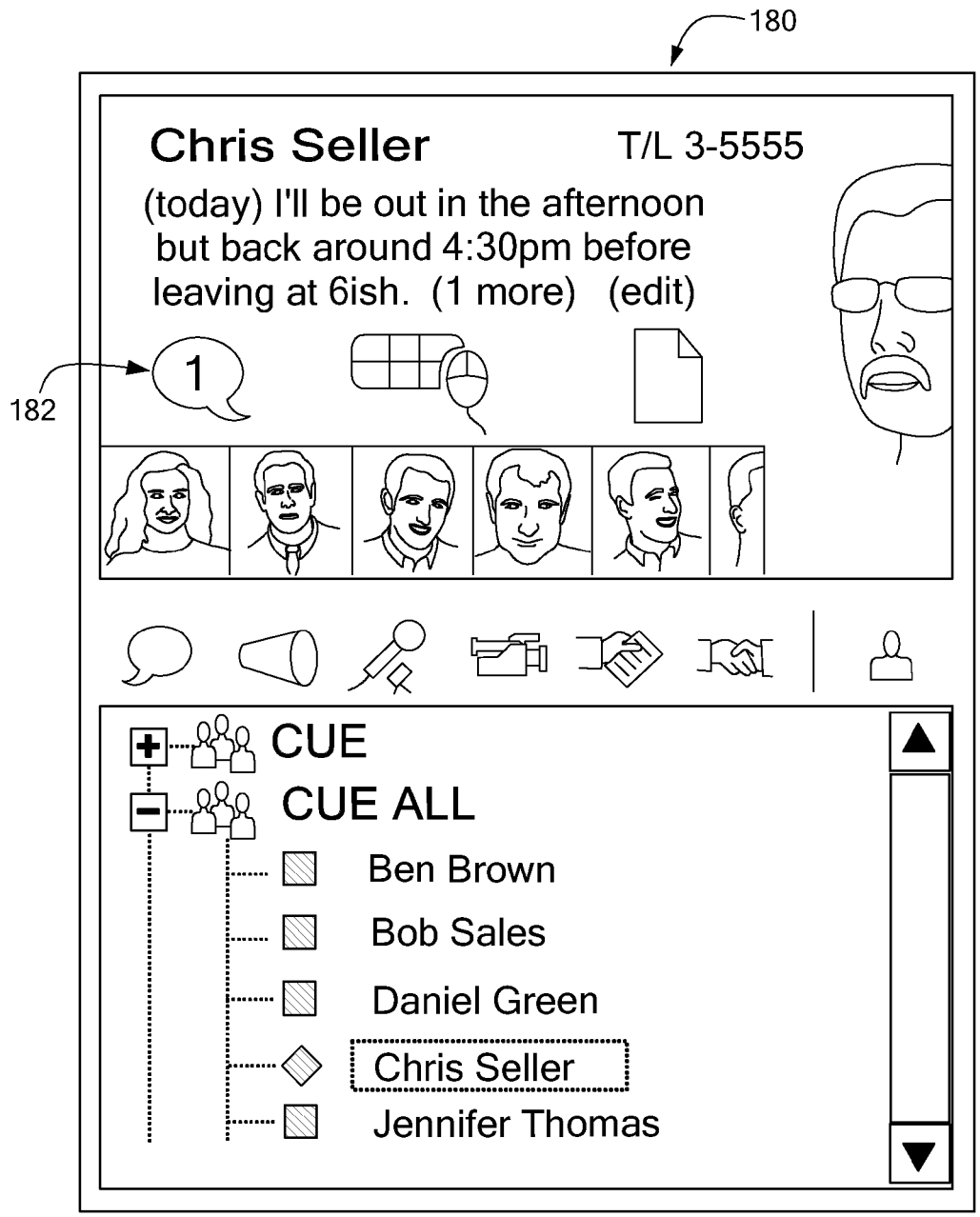
FIG. 7 shows an example of an icon for presenting chat session activity of a remote user to a local user.

4. Activity Information Regarding Current and Recent Instant Messaging Sessions of Remote Users FIG. 7 shows an example of an icon 182 for presenting chat session activity of a remote user to a local user through a display 180 for a remote user selected by a local user by clicking on an awareness object, entry in a buddy list, or in some other way. As shown in FIG. 7, the icon 182 may include an indication of the number of current chat sessions for the selected remote user, in the example of FIG. 7 indicated by the number "1". A set of predetermined colors may also be used in presenting the icon 182 to indicate associated activity levels of the selected remote user. For example, a red color of the icon 182 may indicate a relatively recent chat session activity by the remote user, such as keyboard or mouse activity within a predetermined preceding time period, while a green color of the icon 182 may indicate a relatively low activity level, such as no keyboard or mouse activity within a predetermined preceding time period. The specific shape of the icon 182 in FIG. 7 is for purposes of illustration only, and the disclosed system is not limited to such shape. Any specific shape may be used to represent the icon for presenting chat session activity of a remote user to a local user.

While in the example of FIG. 7 the number of current chat sessions, and an activity level within one or more of those chat sessions, is shown through the icon 182, alternative embodiments may be used in this regard. In one such alternative embodiment, awareness objects themselves could be presented in a way that shows the number of chat session for the associated remote user. For example, an awareness object could indicate the number of current chat sessions for the remote user in a number in parenthesis next to the awareness object, or in some other way. In another alternative embodiment, in the event that a local user requests a chat session with a remote user, the awareness client application process could intercept the request, and present a modal dialog box to the local user indicating the number of current chat sessions for the remote user, and their activity levels, and asking whether the local user wanted to continue initiating the requested chat session. Such a modal dialog box might, for example, include a graphical button marked "OK", "CONTINUE", or the like, for the user to click on to provide an indication that the initiated request should be continued, and a button marked "STOP", "TERMINATE", or the like, for the user to click on to provide an indication that the initiated request should be terminated.

Figure 8:
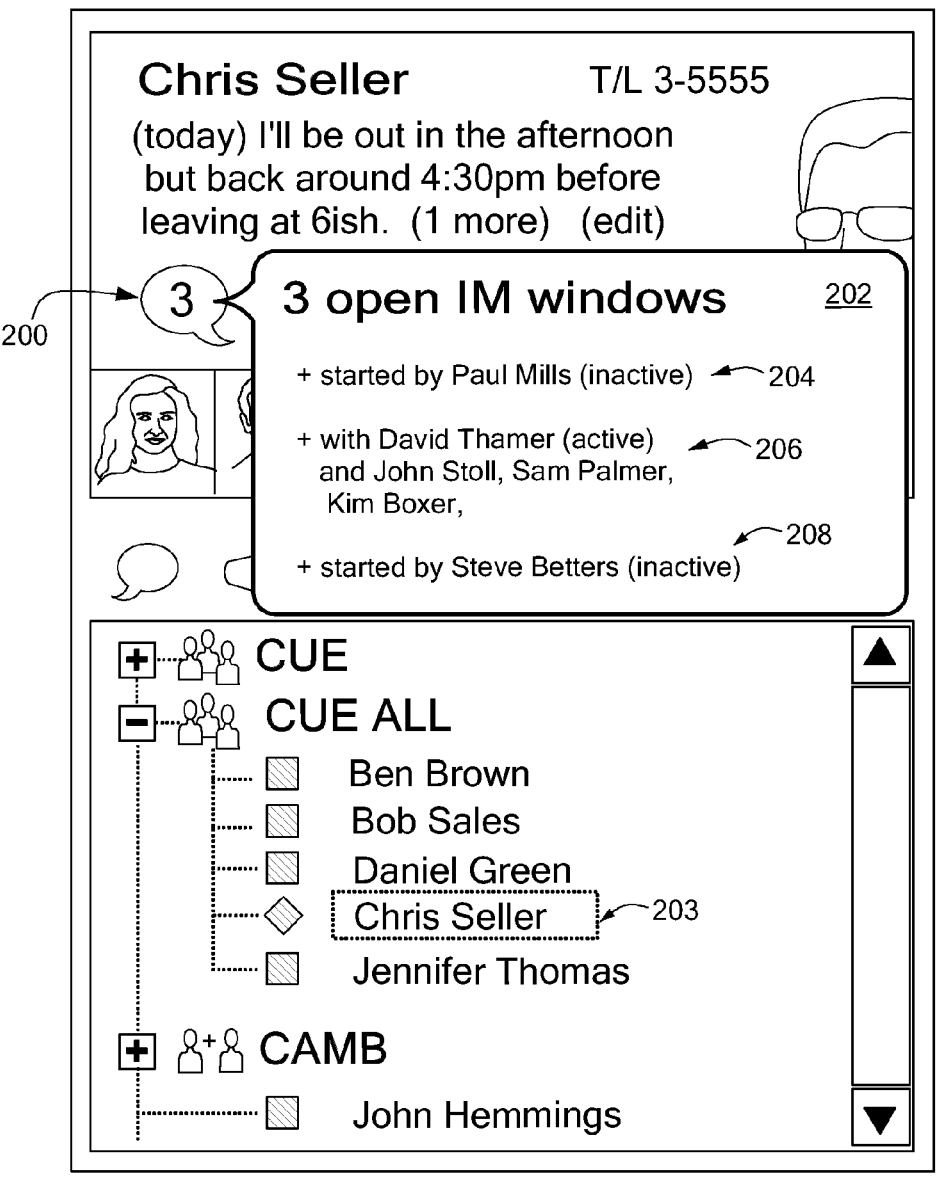
FIG. 8 shows an example of a hover over information display for presenting chat session activity of a remote user to a local user.

FIG. 8 shows an example of a hover over information display 202 for presenting chat session activity of a selected remote user to a local user. In the example of FIG. 8, the selected remote user was selected by the local user clicking on the entry 203 for the remote user in the buddy list. The information display 202 results when a local user hovers the cursor over the icon 200. As shown in FIG. 8, the chat session activity information within the display 202 includes indication 204 of a chat session that is currently inactive, including an indication of the initiator of that chat session. The chat session activity information within the display 202 also includes indication 206 of another chat session that is currently active, and listing the names of the participants in that chat session. The chat activity information within the display 202 further includes indication 208 of another inactive chat session, and the name of the initiator of that chat session.

Figure 9:
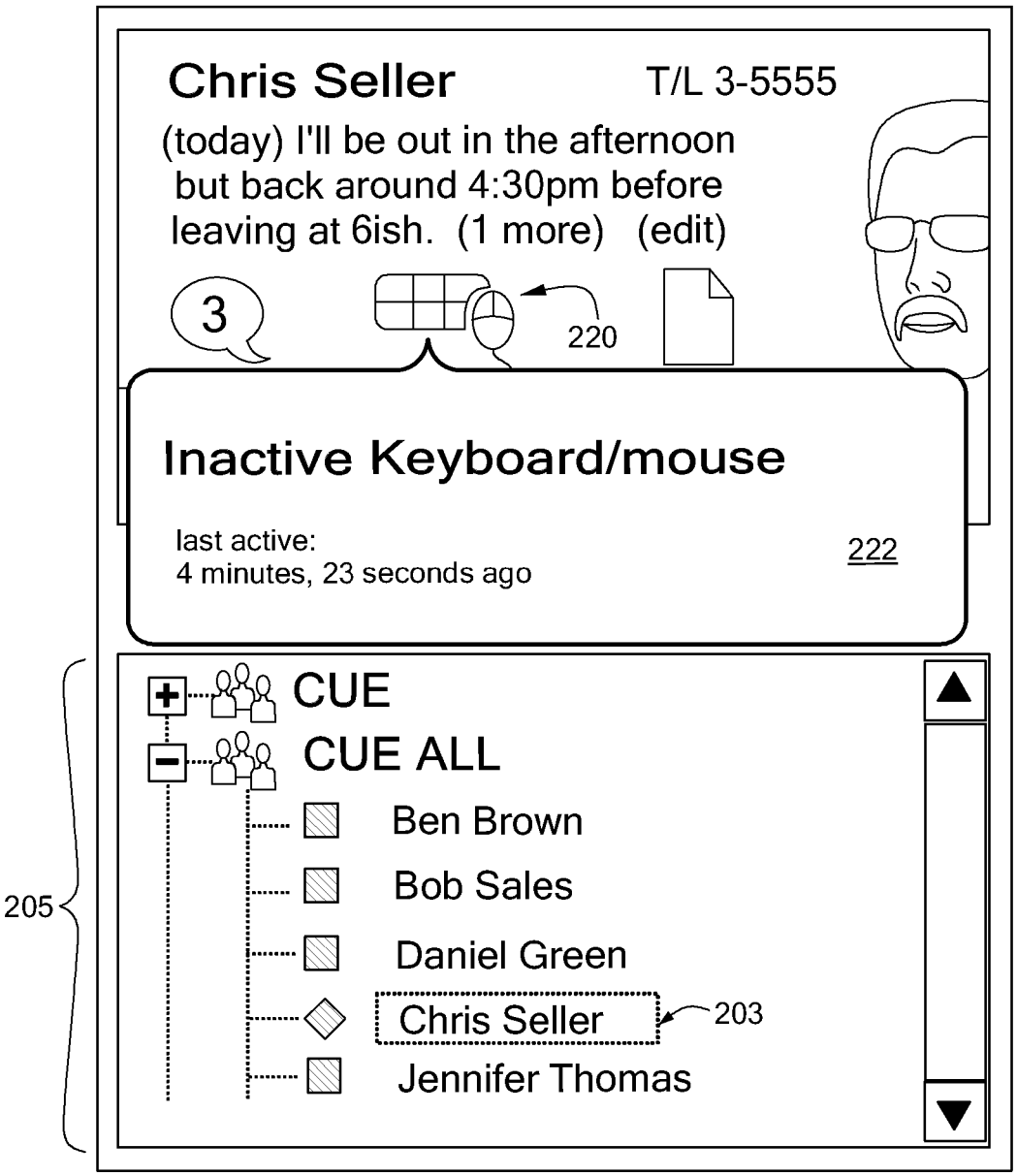
FIG. 9 shows an example of an icon and hover over display for presenting keyboard and mouse activity of a remote user to a local user.

FIG. 9 shows an example of an icon 220 for providing access to information regarding the keyboard and mouse activity of a selected remote user. In the example of FIG. 9, the selected remote user was selected by the local user clicking on the entry 203 for the remote user in the buddy list 205. A hover over display 222 presents the keyboard and mouse activity of the selected remote user. The hover over display 222 is the result of the local user hovering the cursor over the icon 220. In this case, the disclosed system indicates that the remote user has been inactive for four minutes and twenty three seconds with regard to at least one chat session of the remote user.

Figure 10:
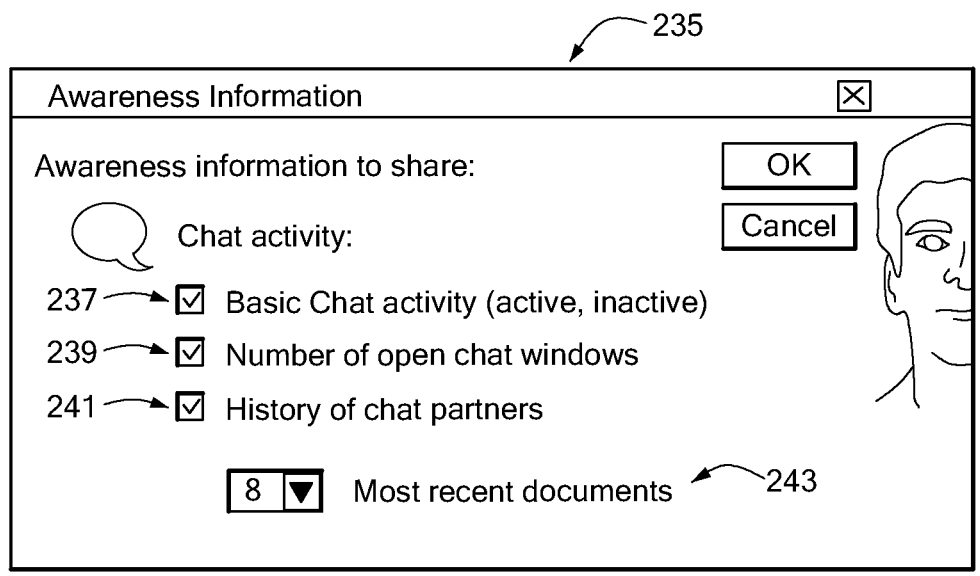
FIG. 10 shows an example of a user interface for controlling information provided to other users regarding chat sessions.

FIG. 10 shows an example of a user interface 235 for controlling chat session information provided to other users. In the user interface 235, the user is presented with check box 237 to provide indication of whether basic chat session activity information, describing whether the user is currently active or inactive, is to be shared with other users. The user is further presented with the check box 239 to provide indication of whether the number of open chat windows for the user is to be shared with other users, and a check box 241 to provide indication of whether a history of past chat partners is to be shared with other users. Additionally, the user is able to select the number of recent chat partners that is to be shared with other users through the pull down object 243. The specific parameters for controlling the chat session activity information shared with other users shown in FIG. 10 is given for purposes of illustration only, and the disclosed system may be embodied using various specific user-configurable control parameters in this regard.

In another embodiment, in addition to enabling a user to specify the specific chat session activity information to share, the awareness client application process provides a user interface for specifying the users with. For example, such other users may be specified by an interface enabling selection from or indication of one or more of the following: email distribution directory groups, document access control lists, buddy lists, recent chat participants, specified individuals, etc.

5. Activity Information Regarding Document Accesses of Remote Users

Figure 11:
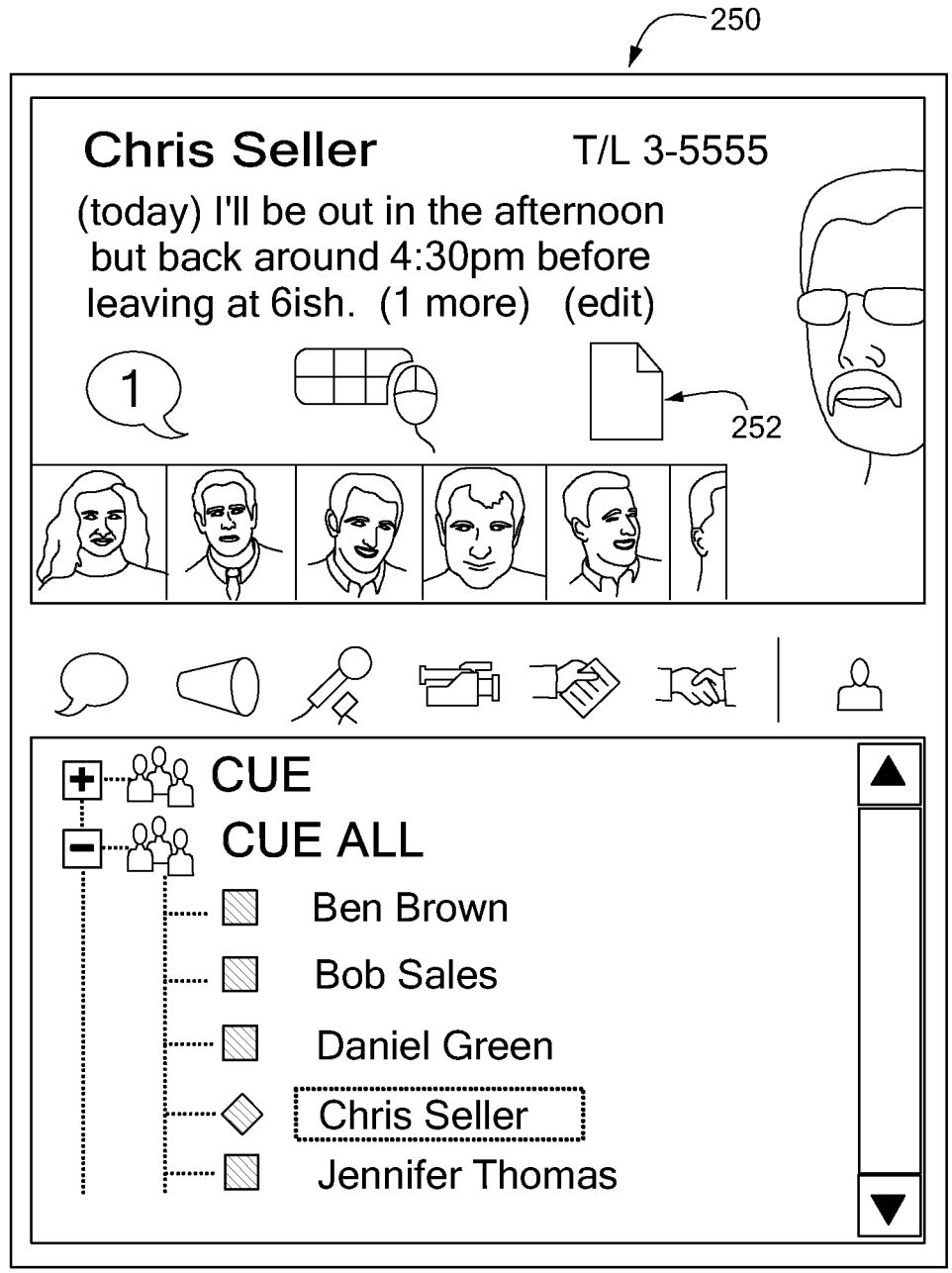
FIG. 11 shows an example of an icon associated with document activity of a remote user in a display for a local user.
Figure 12:
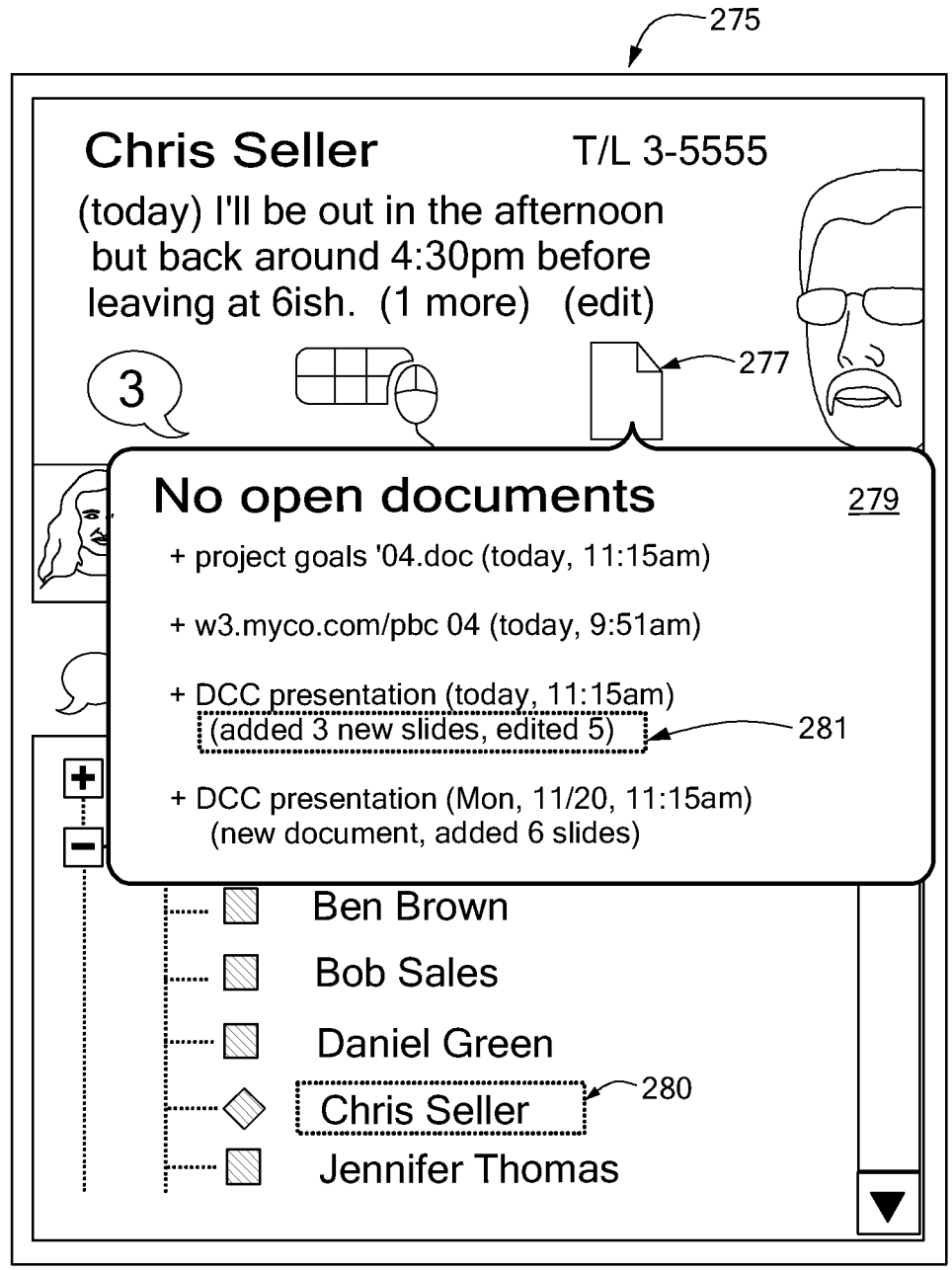
FIG. 12 shows an example of a hover over display for presenting document activity of a remote user to a local user.

FIG. 11 shows an example of an icon 252 associated with document access activity of a remote user in a display 250 for a selected local user. FIG. 12 shows an example of a hover over display 279 for presenting document access activity of a remote user to a local user. As shown in FIG. 12, the hover over display 279 results when the local user hovers the cursor over the icon 277. The hover over display 279 includes information such as the titles of documents accessed by the selected remote user, the time and date of such accesses, and comments regarding the actions performed during the accesses. A list of actions 281 during the associated access presents the local user with an "audit trail" regarding actions performed by the remote user on the associated document. Accordingly, with regard to the DCC presentation accessed at 11:15 today, the list of actions 281 indicates that the remote user added three new slides, and edited five slides. Any specific type of action that may be described by the disclosed system in an audit trail within a document activity display, such as, for example, printing, editing text, saving edits, etc. The selected remote user in the user display 275 of FIG. 12 is shown as a selected user 280 within a buddy list of the user display 275. Alternatively, the selected remote user may be determined by selection of an awareness object associated with the remote user from another application program by the local user.

Figure 13:
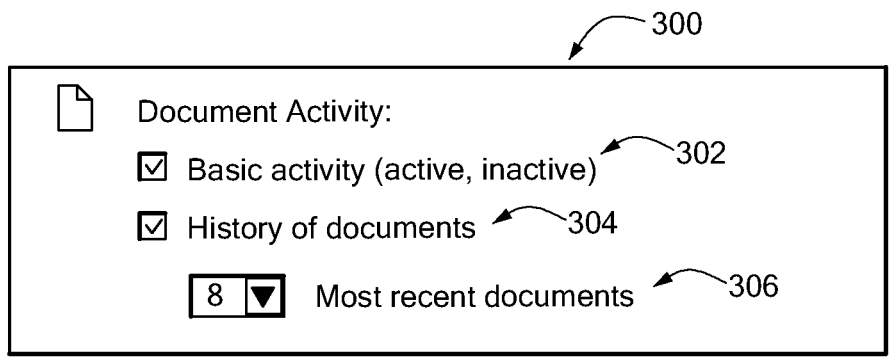
FIG. 13 shows an example of a display for indicating the document activity of a user to be shared with other users.

FIG. 13 shows an example of a display 300 for indicating the document access activity of a user to be shared with other users. As shown in FIG. 13, the display 300 provides an interface for a user to indicate whether or not basic document activity is to be shared with other users through the check box 302. The display 300 further provides an interface for a user to indicate whether or not a history of document accesses is to be shared with other users through the check box 304. Additionally, the display 300 provides a pull down list 306 for a user to indicate how many documents most recently accessed are to be identified to other users.

Figure 14:
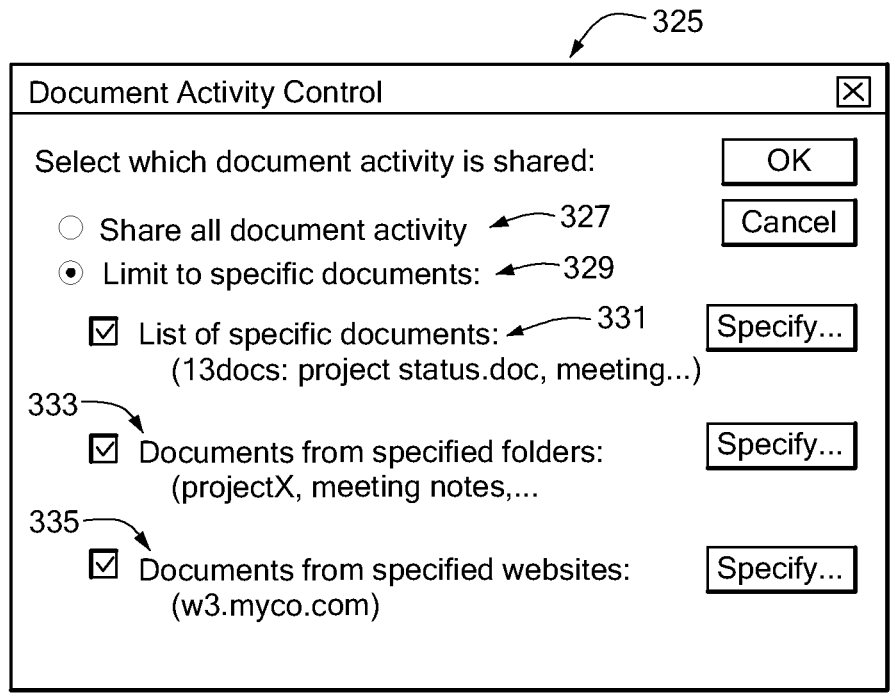
FIG. 14 shows an example of a display for indicating in greater detail the document activity of a user with other users.

FIG. 14 shows an example of a display 325 for indicating with greater detail how document activity of a user is to be shared with other users. As shown in FIG. 14, the display 325 enables the user to provide an indication 327 that all document activity is to be shared with other users, or an indication 329 that only document activity related to certain documents is to be shared. Further in the display 325, the user may provide indication 331 that a list of documents is to be specified for which document access activities are to be shared. The user is also allowed to provide indication 333 that document access activities relating to documents from certain specified folders is to be shared. Finally, the user may provide an indication 335 that document access activities relating to documents from certain specified websites is to be shared.

Alternatively, or in addition, other options may be provided in a user interface for specifying limits to the disclosed system regarding how document activity of a user is to be shared with other users. For example, in some cases a shared document may be specified that is associated with certain editing users, in which case the document access activities are to be shared with only those remote users that are also defined as editors of the document. This may also be the case when those remote users are referenced or listed as part of a specified project or activity construct associated with that document. For example, if a project application lists a set of documents as resources for a particular project instance, then a user of the disclosed system may be allowed to specify that activities relating to some or all of the documents listed for that project instance are to be shared with other users. Along similar lines, if one or more documents are associated with a work flow, in that those documents are used or distributed via the work flow, then a user may indicate that the disclosed system may only share document access activities regarding those documents with other participating users of the work flow. The preceding techniques for controlling how and with whom document access activities are shared are provided as examples only, and the disclosed system may be embodied with any other specific technique or interface in this regard.

6. Activity Information Regarding Communication Application Use by Remote Users

Figure 15:
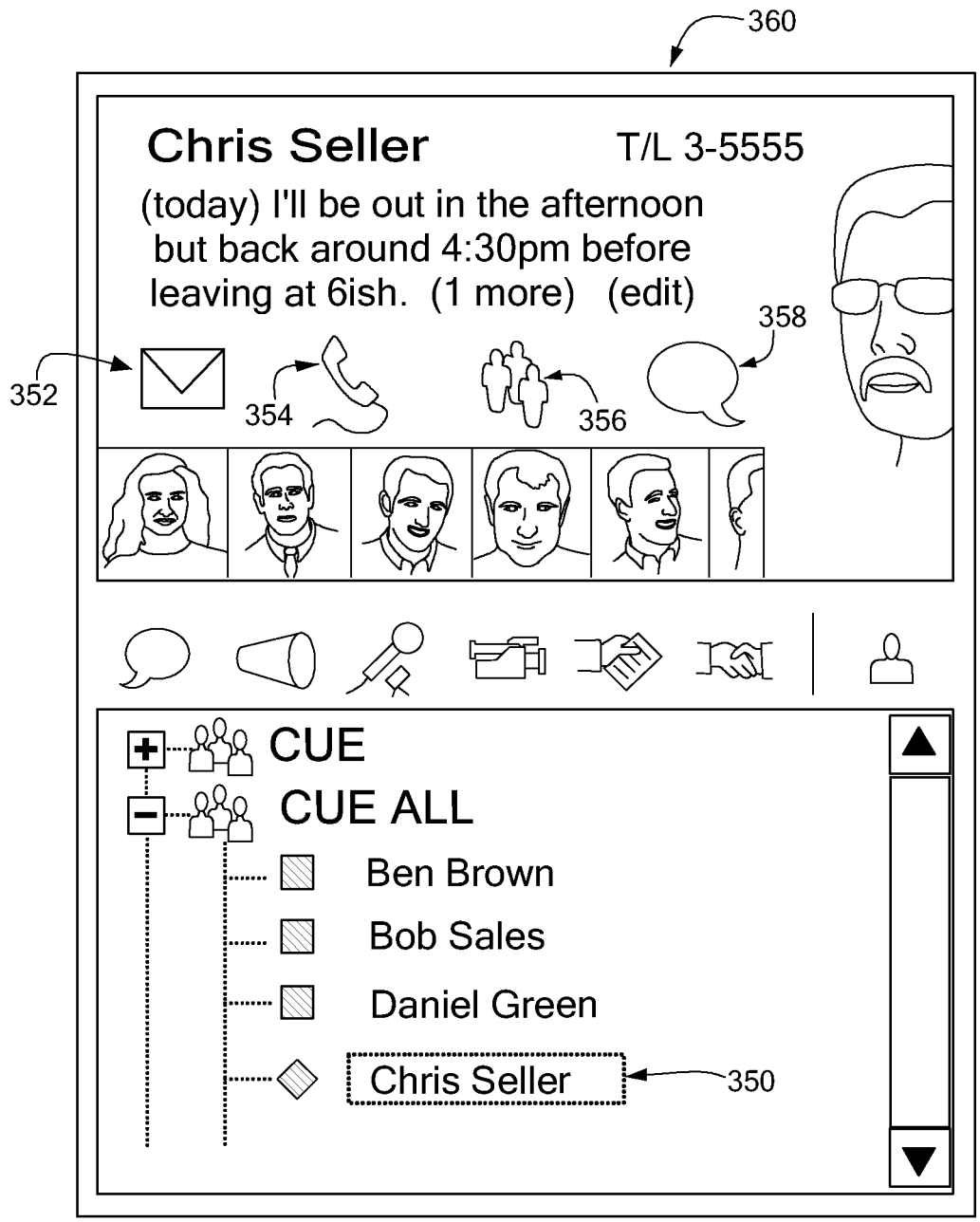
FIG. 15 shows an example of a display including communication mode icons for providing communication mode activity information for a remote user to a local user.

FIG. 15 shows an example of a display 360 including communication mode icons for providing a local user with communication mode activity information for a selected remote user 350. The display 360 is shown including an email activity icon 352, an IP phone activity icon 354, an electronic meeting activity icon 356, and a chat session activity icon 358. In the example of FIG. 15, hovering the cursor over any of the communication mode icons shown in the display 360 will result in information being presented regarding the selected remote user. Clicking on any of the communication mode icons shown in the display 360 enables the local user to initiate one of the communication applications associated with the respective communication mode icon.

Figure 16:
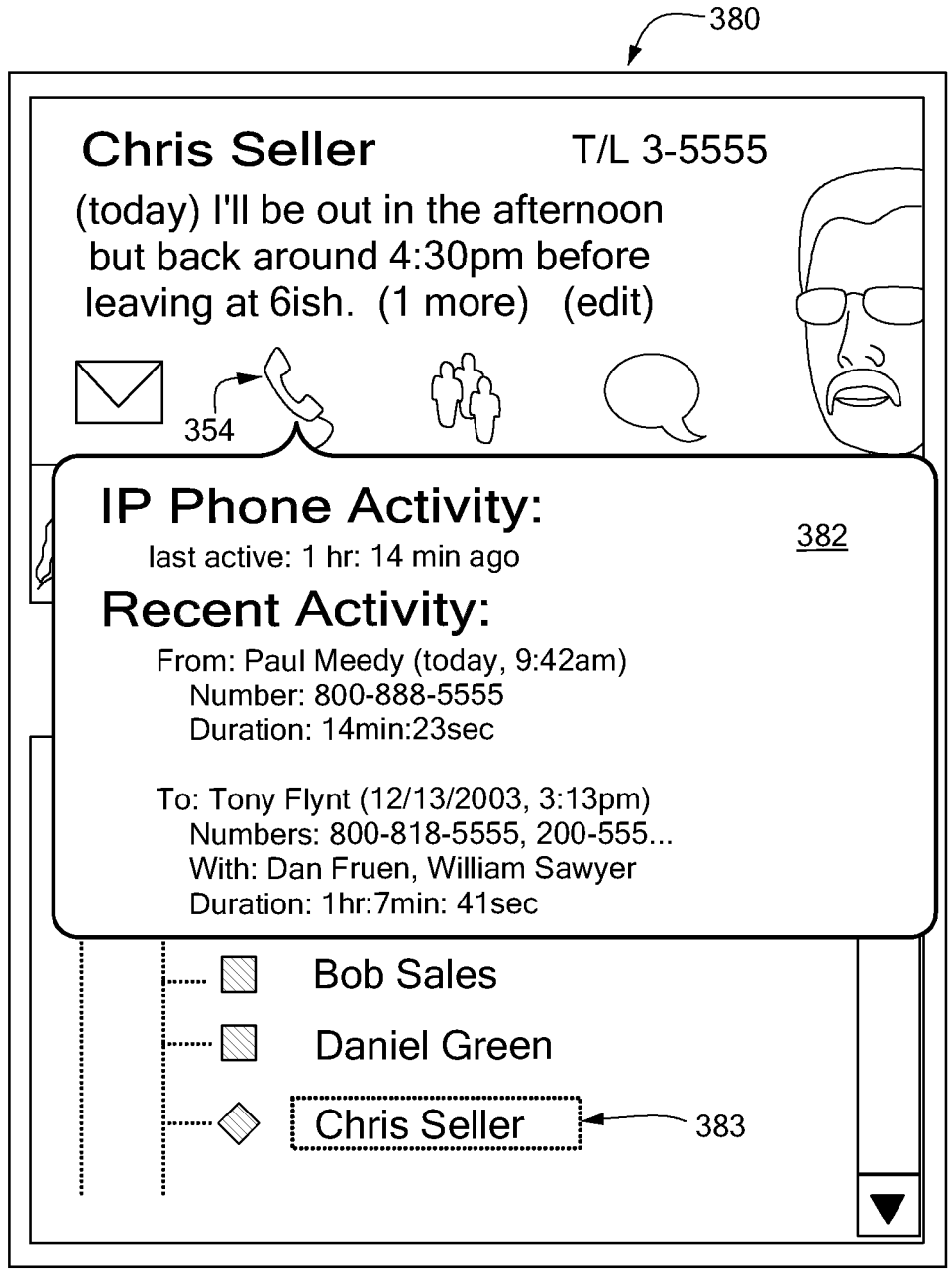
FIG. 16 shows an example of a hover over display for presenting IP phone activity of a remote user to a local user.

FIG. 16 shows an example of a hover over display 382 for presenting a local user with IP phone activity of a selected remote user 383. As shown in FIG. 16, the hover over display 382 results when the local user hovers the cursor over the IP phone activity icon 354 in the user display 380. The hover over display 382 is shown including information describing how long since the last time the selected remote user had an IP phone conversation, and information describing recent IP phone activity including phone numbers, participants, times of calls and durations, and call initiator indications.

Figure 17:
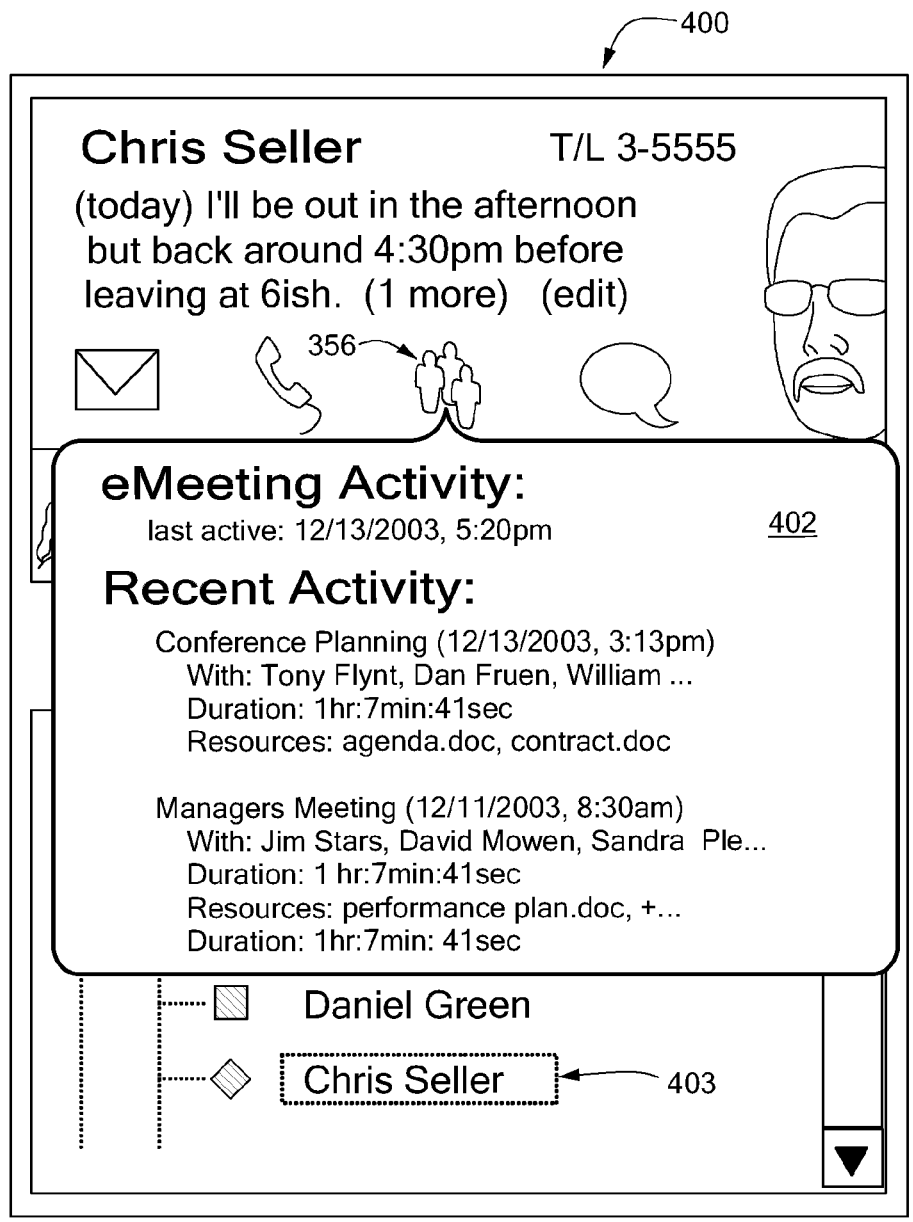
FIG. 17 shows an example of a hover over display for presenting electronic meeting activity of a remote user to a local user.

FIG. 17 shows an example of a hover over display 402 for presenting a local user with electronic meeting activity information regarding a selected remote user 403. As shown in FIG. 17, the hover over display 402 results when the local user hovers the cursor over the electronic meeting activity icon 356 in the user display 400. The hover over display 402 is shown including information describing the last time the selected remote user participated in an electronic meeting, recent electronic meeting activity including the names, participants, times and durations of recent electronic meetings. The hover over display further includes indications of resources used in recent electronic meetings in which the selected remote user was a participant, including file names of presentations and other documents.

Figure 18:
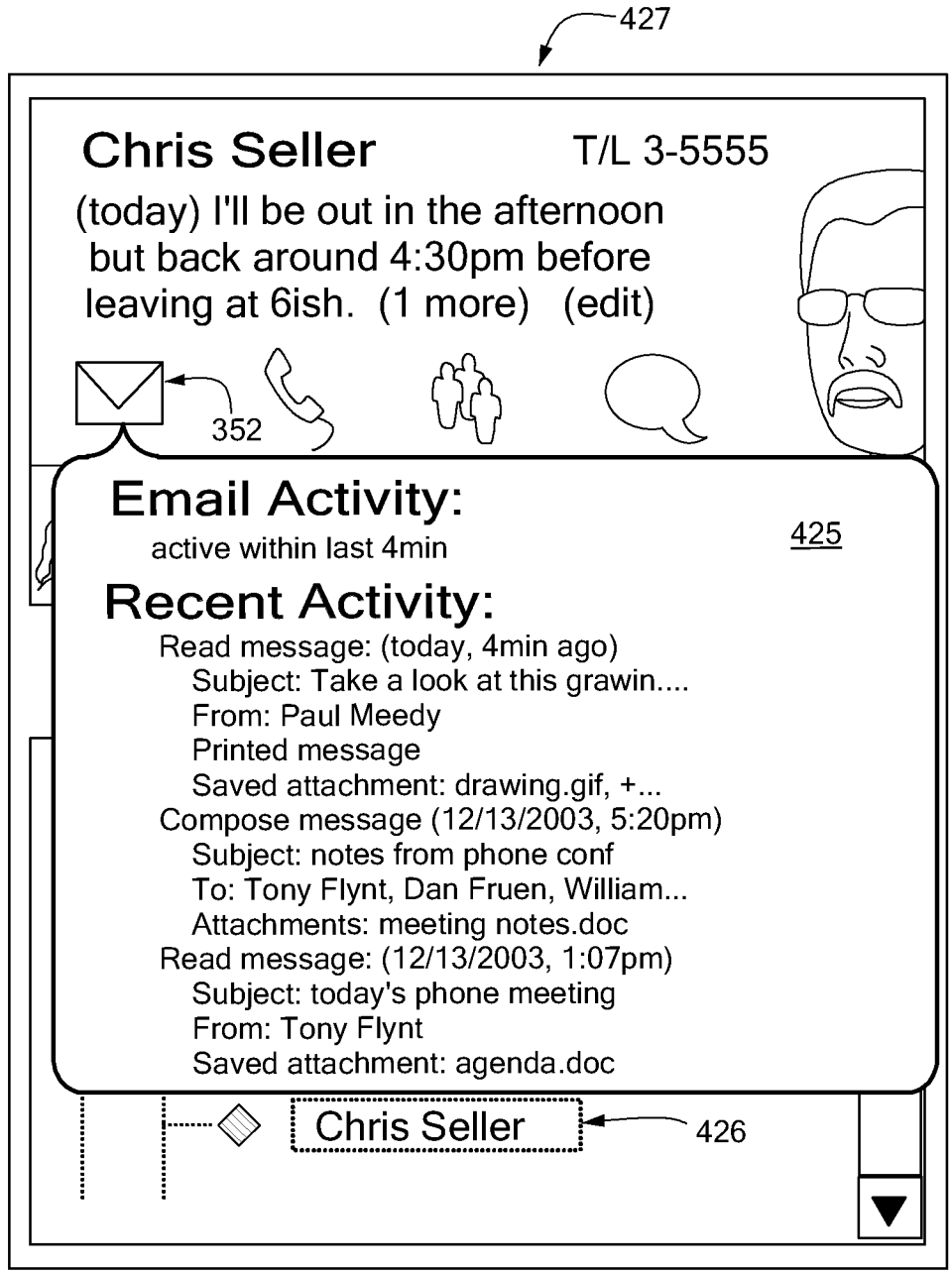
FIG. 18 shows an example of a hover over display for presenting electronic mail activity of a remote user to a local user.

FIG. 18 shows an example of a hover over display 425 for presenting a local user with electronic mail activity of a selected remote user 426 to a local user. As shown in FIG. 18, the hover over display 425 results when the local user hovers the cursor over the electronic mail activity icon 352 in the user display 427. The hover over display 425 is shown including information describing the last time the selected remote user was active in an electronic mail application, and recent electronic mail activity information including the times the remote user read electronic mail messages, the subjects of the electronic mail messages received or sent by the remote user, the senders or recipients of the electronic mail messages received or sent by the remote user, names of any attachments to electronic mail messages received or sent by the remote user, as well as actions performed by remote user, such as printing and/or saving of messages and/or attachments. Thus the hover over display 425 includes indications of the resources used in recent electronic mail messages either received or sent by the selected remote user, including file names.

Figure 19:
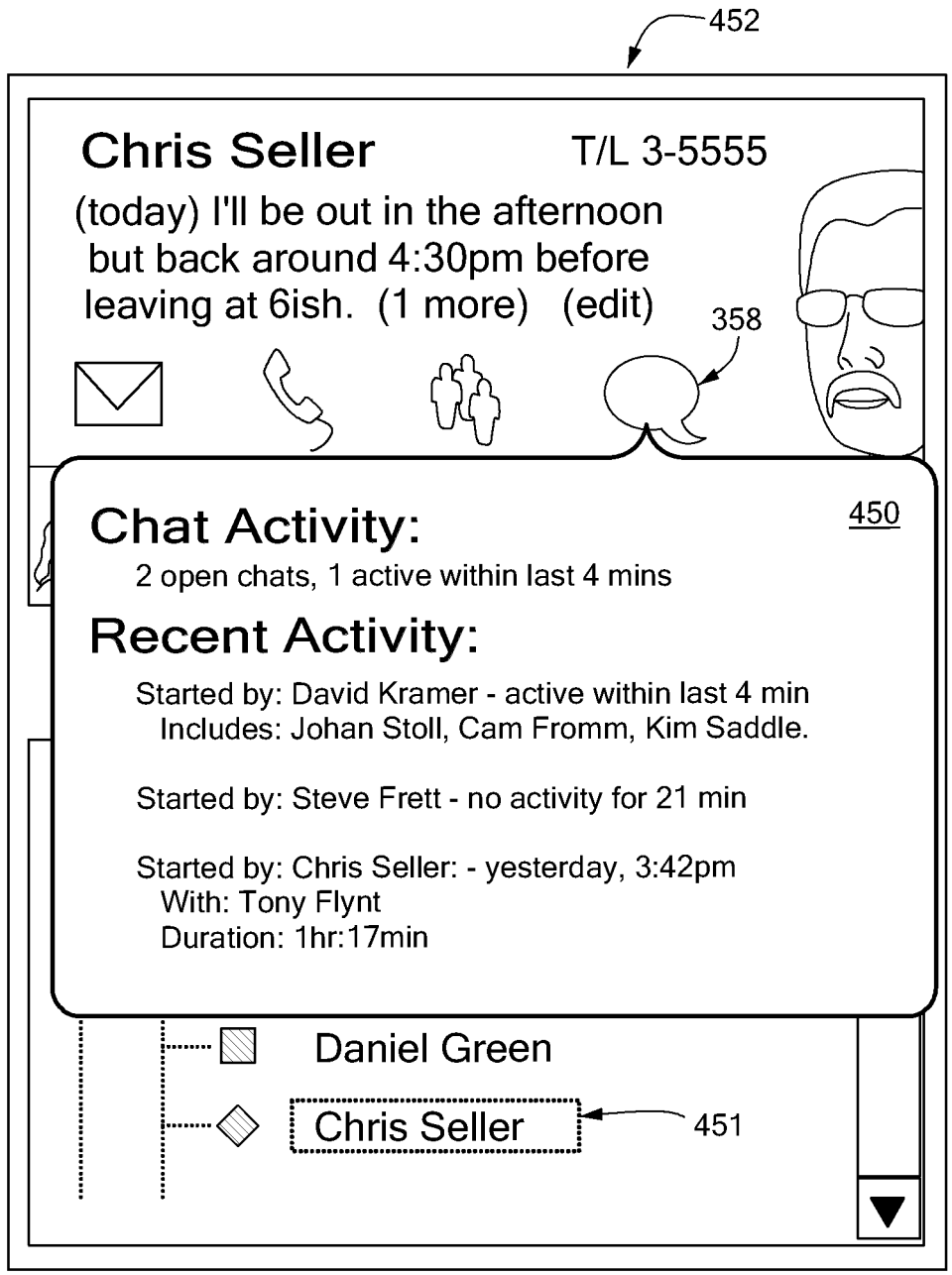
FIG. 19 shows an example of a hover over display for presenting chat activity of a remote user to a local user.

FIG. 19 shows an example of a hover over display 450 for presenting a local user with chat activity information of a selected remote user 451. As shown in FIG. 17, the hover over display 450 results when the local user hovers the cursor over the chat session activity icon 358 in the user display 452. The hover over display 450 is shown including information describing how many chat sessions the remote user is currently involved in, and the number of such current chat sessions that have recently been active, as well as an indication of the time since the last one of the current chat session has been active. The hover over display 450 further includes recent chat session activity information describing the start times, participants, time since last activity, duration, start time, and/or initiating user for each recent chat session in which the selected remote user was involved. The time period over which recent chat sessions of the selected remote are displayed in the hover over display 450 may be configured by a user or system manager as appropriate for a given embodiment or execution environment.

Figure 20:
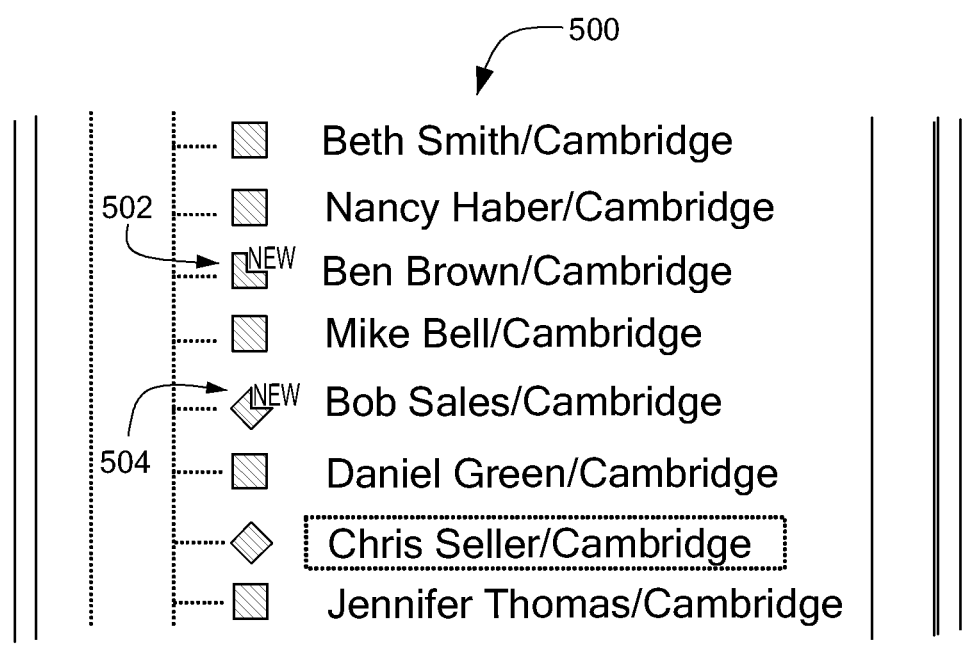
FIG. 20 shows an example of a display of a buddy list having online status icons including indications of updated status messages.

7. Providing a Local User with an Indication of Updated Status Information for a Remote User FIG. 20 shows an example of a display 500 of a buddy list having online status icons 502 and 504 including indications of updated status messages. As shown in FIG. 20, the disclosed system may be embodied to provide visual indications of updated status messages in association with graphical representations of the online status of a remote instant messaging user. In the display 500, for purposes of illustration, each of the user entries in the buddy list have an associated online status icon to the left of the user name. For example, if a user in the buddy list is on-line and active, a square shaped on-line status icon is shown to the left of the user's name in the buddy list entry for that user. If a remote user is currently online and away, then a diamond shaped status icon is shown to the left of the user's name in the buddy list entry for that user. Other shapes, colors or other visual indications may be used to represent other online status, or alternatively to represent the online status associated with square and/or diamond shaped status icons in the example of FIG. 20. In any case, the disclosed system operates to provide an additional visual indication that a new status message is available for a remote user. As shown in FIG. 20, the word "NEW" is added to the online status icons 502 and 504 of those users for which a new status message is available. Any specific visual indication of the availability of a new status message may be used, such as, for example, changes to the color or shape of the online status icon, flashing or blinking the status icon, or some other change in appearance. The modified appearance of the online status icon may be presented for some predetermined time period after the new status message for the associated user becomes available, for example, as controlled by a timer set by the awareness client application process when the visual indication of the new status message is first presented. In the illustrative embodiment, when a local user hovers the cursor over the entry in the buddy list for an associated remote user, the status message for that remote user appears in a hover over display.

The disclosed system operates to display a hover over status message display for a remote user in the buddy list that when that remote user currently online. This includes remote users having an online status of online and active, online and away, online and using a mobile device, or online but "do-not-disturb". Additionally, the disclosed system operates to provide a hover over status message for remote users that are not currently online. This operation is supported by storage of user defined status messages in a remote database, such as a history database within a remote awareness server system, retrieval of such messages from the remote database by the client system.

In the case where the online status icon for the remote user indicates a new status message, display of the hover over message including the new status message causes the visual indication of the new status message to be cleared, returning the online status icon to its normal appearance. For example, the text "NEW" over the online status icon would be removed following display of the new status message.

While in the example of FIG. 20 the modified online status icons 502 and 504 are provided by the awareness client application process or another instant messaging application within the visual context of a buddy list, such modified online status icons may alternatively be presented by the disclosed system in visual association with awareness objects presented in portions of the user display associated with other application processes on the client system, such as other types of communication application processes, or any other specific type of application.

Figure 21:
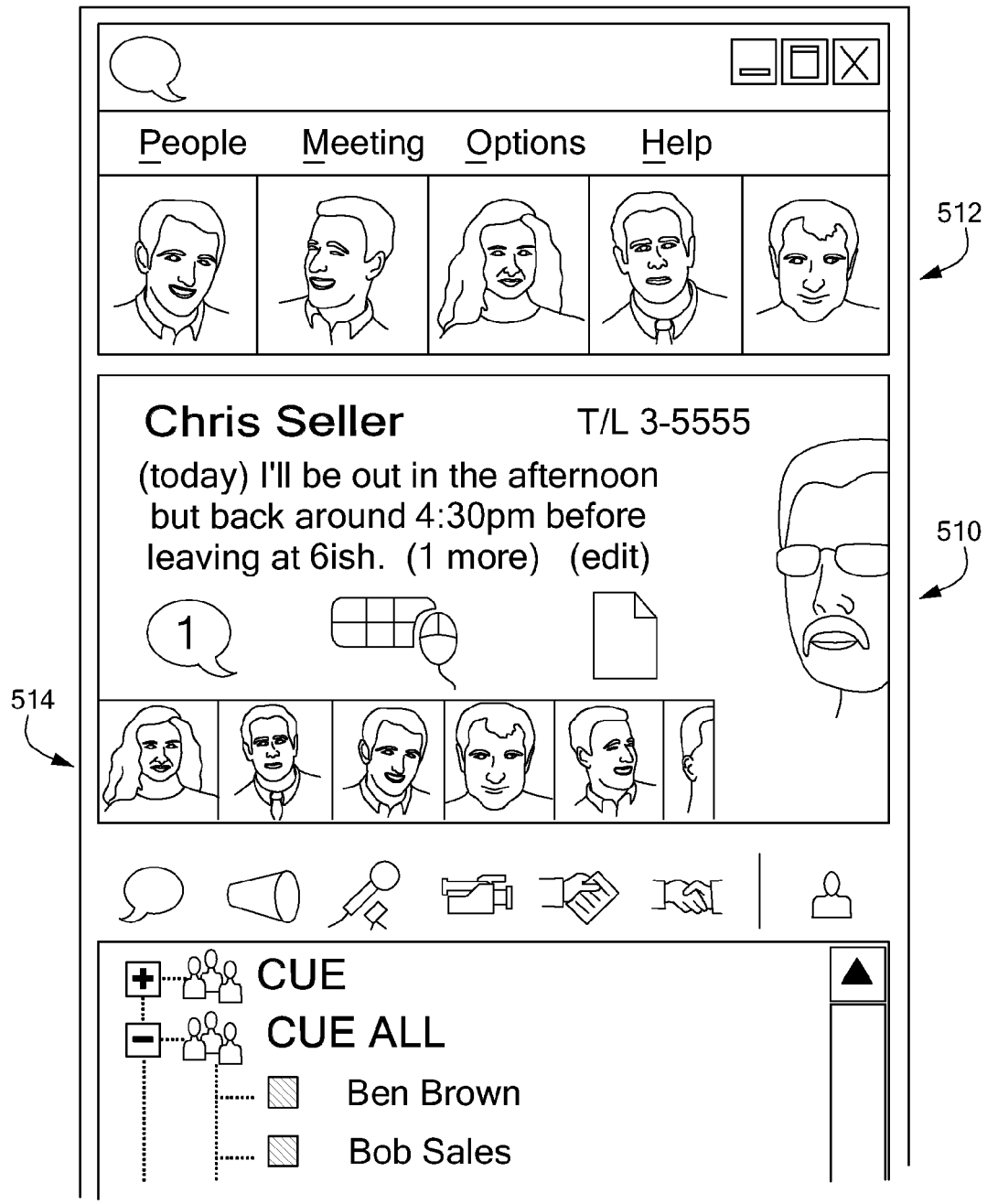
FIG. 21 shows an example of a display including representations of users having recently communicated with a remote user and users having recently communicated with a local user.

8. Providing a Local User with a Representation of Recent Networking Activities of a Remote User FIG. 21 shows an example of a display 510 including visual representations 514 of users having recently communicated with a remote user, and visual representations 512 of users having recently communicated with a local user. The remote user having recently communicated with the users shown in the images within the visual representations 514 may have been selected by a local user from a buddy list displayed to the local user by the awareness client application process, or through an awareness object associated with the remote user. The local user may be a user of a client system on which the awareness client application process is executing.

Figure 22:
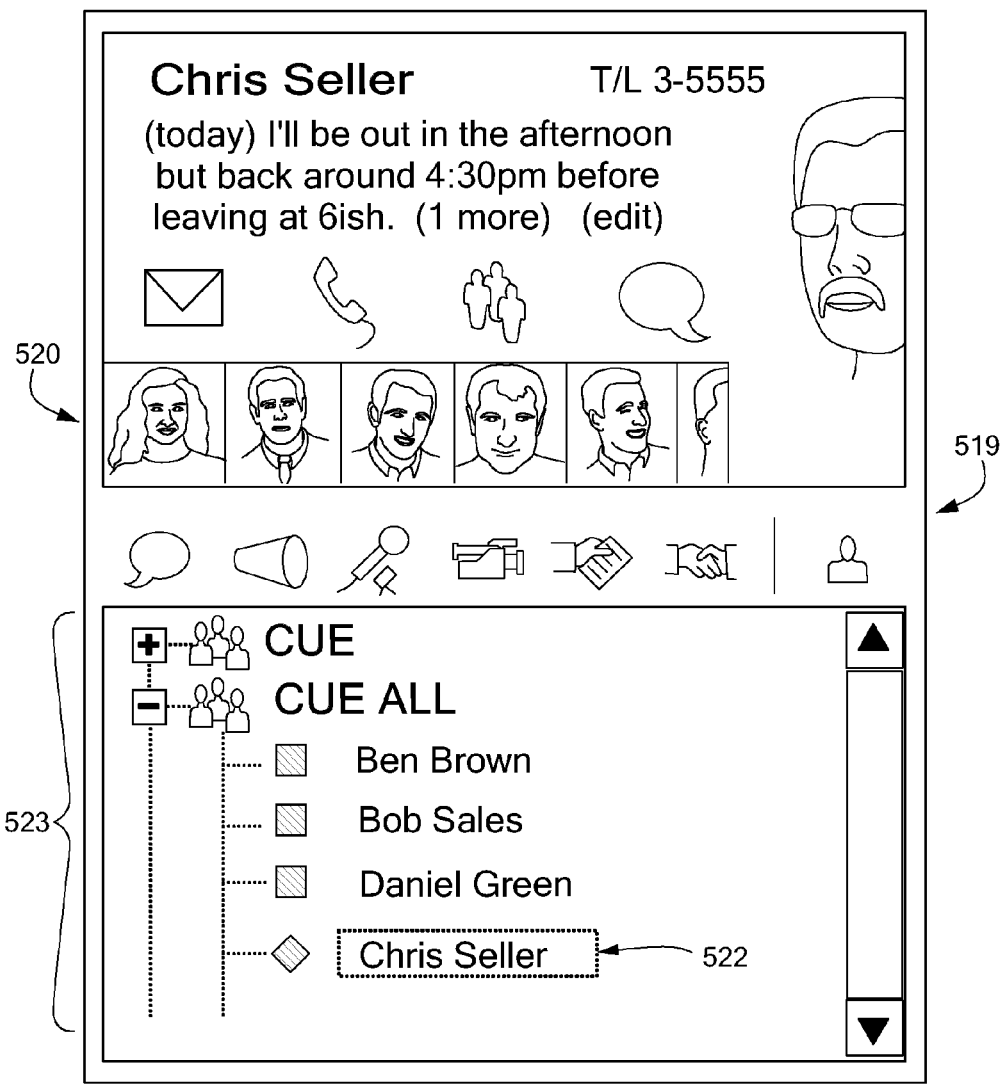
FIG. 22 shows an example of a display including representations of users having recently communicated with a selected remote user.

The user images and identities of the users shown in the visual representations 514 may be conveyed to an awareness client application process from an awareness server application program or another server application process, such as a remote database program. Such images and identities may originate, for example, from awareness information provided by an awareness client application program executing on a client system associated with the remote user. The user images in the visual representations 514 are shown in an order in which communications occurred between the remote user and respective ones of the represented users. For example, users shown to the right of the visual representations 514 may have had relatively more recent communications with the remote user than users shown to the left, or vice versa. Such ordering may also be provided in the visual representations 514 of users having been in recent communication with the local user. While the representations 512 and 514 are shown for purposes of illustration as images of the corresponding users, the disclosed system is not limited to such an embodiment. Any specific type of visual indication may be used in this regard, such as names of the respective users, email addresses, instant messaging names, etc. FIG. 22 shows an example of a display 519 including representations 520 of users having recently communicated with a selected remote user 522 within a buddy list 523 provided by the awareness client application process.

Figure 23:
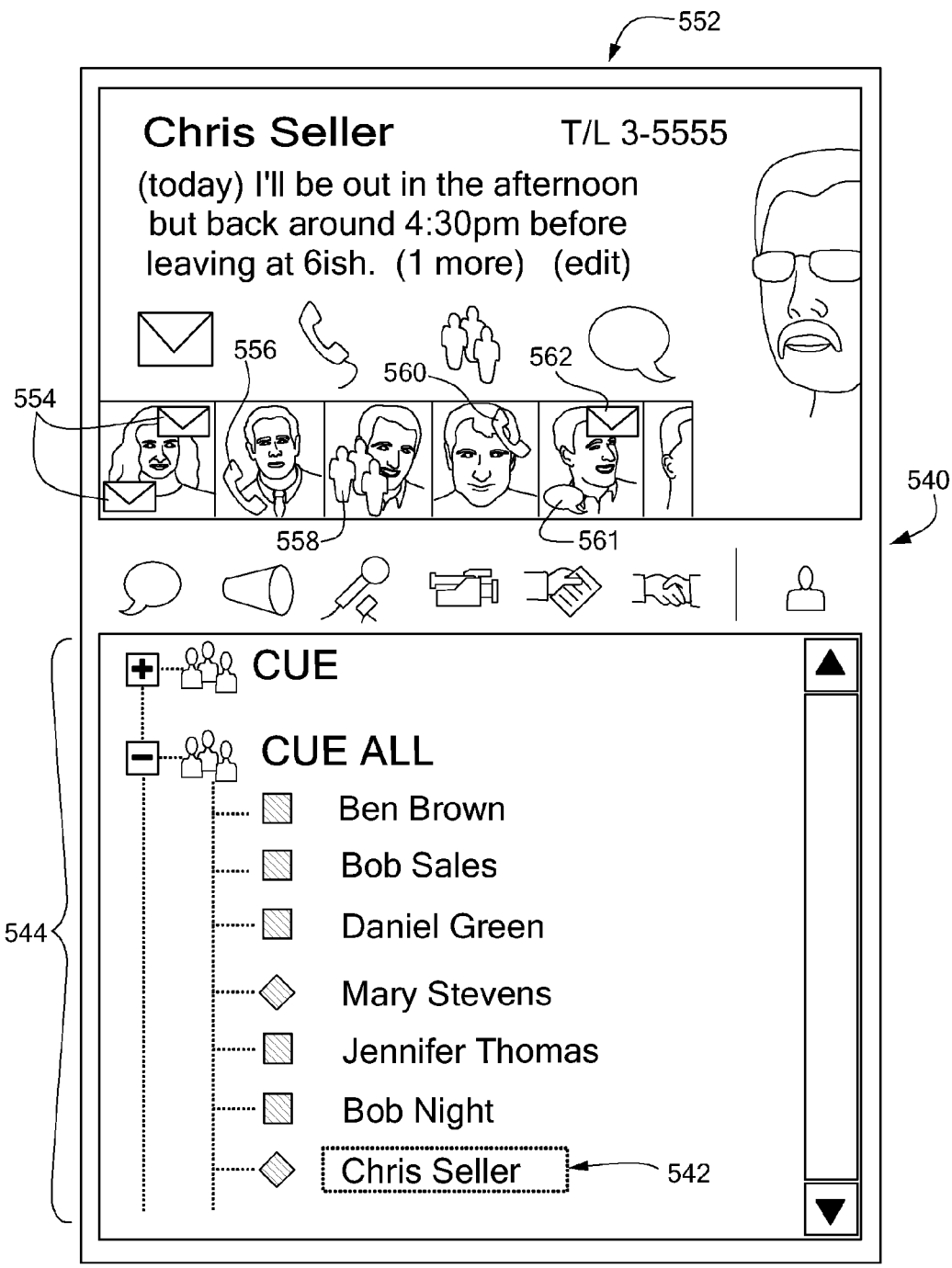
FIG. 23 shows an example of a display including communication application indications provided within representations of users having recently communicated with a selected remote user, and communication application indications provided in association with entries for users in a buddy list.

FIG. 23 shows an example of a display 540 including communication application indications 554, 556, 558, 560, 561, and 562 provided within representations 552 of users having recently communicated with a selected remote user 542 in a buddy list 544, and communication application indications 546, 548 and 550 provided in association with entries for users in the buddy list 544. As shown in FIG. 23, the visual indications 554 and 562 represent electronic mail messages between the selected user 542 and the users whose images the indications 554 and 562 are presented over, the visual indications 556 and 560 represent IP phone calls between the selected user 542 and the users whose images the indications 556 and 560 are presented over, the visual indication 558 represents an electronic meeting including the selected remote user 542 and the user whose image the indication 558 is presented over, and the visual indication 561 represents an instant messaging session between the selected remote user 542 and the user whose image the indication 561 is provided over.

Figure 24:
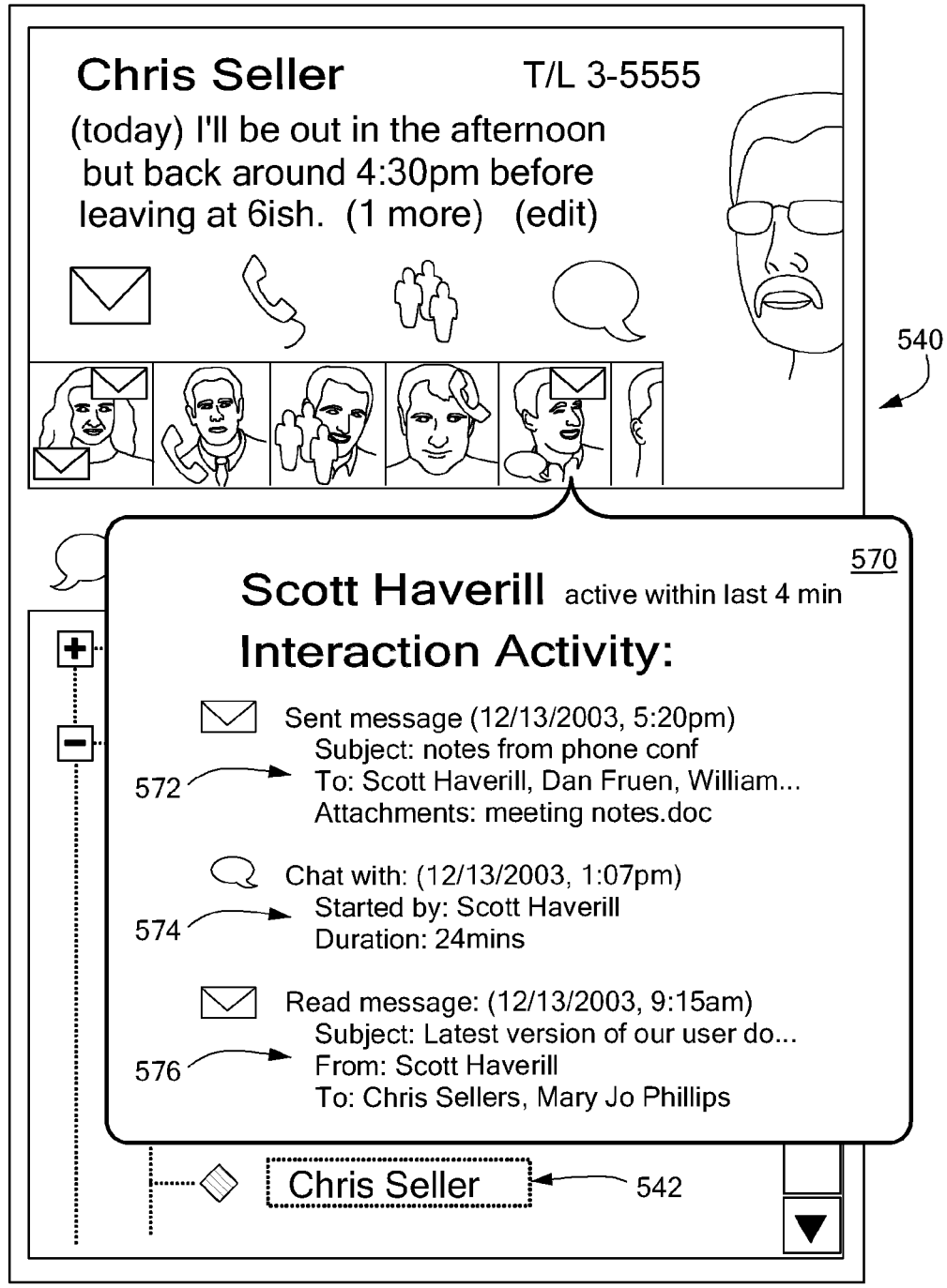
FIG. 24 shows an example of a display including an interaction activity hover over display associated with a representation of a user having recently communicated with a remote user.

In an illustrative embodiment of the disclosed system, if the local user hovers the cursor over one of the representations 552 of users having recently communicated with the selected remote user 542, more detailed information describing the indicated communications involving the selected remote user is presented in a hover over display to the local user. As shown in FIG. 24, the user display 540 may thus provide a hover over display 570 including an interaction activity hover over display associated with a representation of a user having recently communicated with a remote user. The hover over display 570 is shown, for purposes of illustration, including a description 572 of a an electronic mail message involving the selected remote user and the user whose image the cursor is hovered over. The hover over display 570 further includes a description 574 of an instant messaging chat session involving the selected remote user and the user whose image the cursor is hovered over. Additionally, the hover over display 570 includes a description 576 of a second electronic mail message involving the selected remote user and the user whose image the cursor is hovered over. Communication activity information provided in the hover over display 570 may include the participants in the communication, the time and/or duration of the communication, the subject of the communication, any resources involved in the communication, such as file or document attachments, as well as an indication of how much time has passed since the selected remote user has been active in any communication activity.

Figure 25:
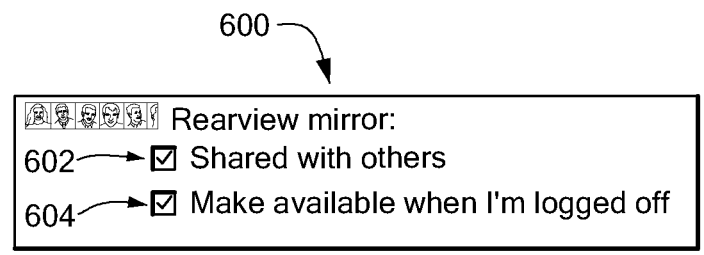
FIG. 25 shows an example of a user interface for determining how recent social networking information of a local user should be shared with other users.

FIG. 25 shows an example of a user interface 600 for determining whether and/or how recent social networking activity information of a local user, such as that illustrated by the communication activity user representations and indications in the displays shown in FIGS. 21, 22, 23 and 24, should be shared with other users. As shown in FIG. 25, the user interface 600 enables the local user to select through check box 602 whether such recent social networking activities ("rearview mirror") information are to be shared at all with other users. The user interface 600 further enables the local user to select through check box 604 whether or not the recent social networking activities of the local user are to be provided to other users when the local user is logged off.

In another embodiment, alternatively and/or in addition to enabling a user to specify the social networking information that is to be shared with other users, the awareness client application process may provide a user interface for the user to specify which users such social networking information is to be shared with. Such an interface may include check boxes and/or pull down menus such as those illustrated for purposes of specifying shared awareness information in the interface 235 of FIG. 10, or use other appropriate user interface techniques. For example, users with which social network information is to be shared may be specified by an interface enabling selection from or indication of individual users and/or explicit user lists. Such user lists may, for example, include one or more of the following: email distribution directory groups, document access control lists, buddy lists, recent chat participants, or the like.

Control over the receipt of social networking information may be provided in various other ways as well, not limited to indication or selection of explicitly defined users or user lists or groups. For example, in some cases a shared document may be specified that is associated with certain editing users, in which case social networking information would be shared with those remote users that are defined as editors of the shared document. Recipients of social networking activity may also be defined to include those remote users that are referenced during or listed as part of a specified project or activity construct. Additionally, the social networking activities may be limited to activities relating to one or more shared documents, and/or to such project or activity constructs. Along similar lines, if one or more remote users are associated with a work flow, then a user may indicate that all or some social networking activity information is to be shared with those remote users. Again, the specific social networking activities shared with the remote users associated with the work flow may also be limited to social networking activities relating to the workflow. The preceding techniques for controlling how and with whom social networking activities are shared are provided as examples only, and the disclosed system may be embodied with any other specific technique or interface in this regard.

Figure 26:
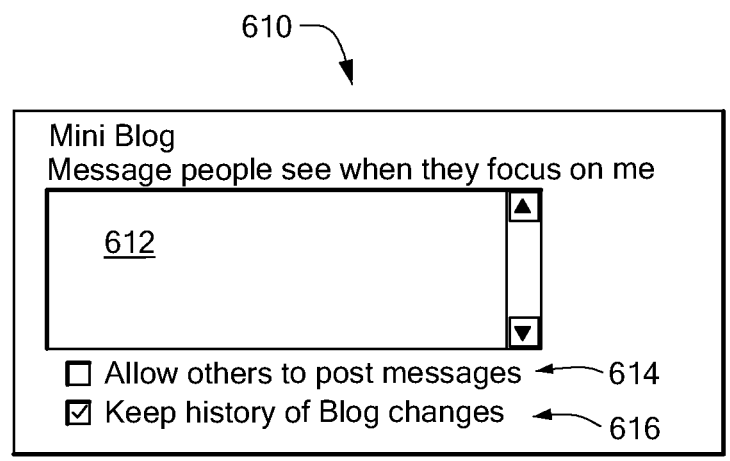
FIG. 26 shows an example of a user interface for determining the contents of an entry into a user status message, as well as whether other users are able to edit the user status message, and whether history of changes to the user status message is to be presented.

9. Enhanced Instant Message Status Message Area Containing Editable Time/Date Stamped Entries FIG. 26 shows an example of a user interface 610 for determining the contents of an entry into a user status message, as well as whether other users are able to edit the user status message, and whether history of changes to the user status message is to be presented. As shown in FIG. 26, the disclosed system enables a user to enter a status message entry into the field 612. The display 610 further enables the user to indicate through the check box 614 whether other users are allowed to create entries for the user's status message, and to indicate through the check box 616 whether a history of status message entries should be included in the display of the status message.

The disclosed system provides the ability for a user to conveniently include links to additional information within the status message entries defined through the display 610. For example, in the event that a set of adjacent characters having a predetermined capitalization format is detected within the field 612, they are treated as a link to web pages. Such a predetermined capitalization format could, for example, consist of all sets of adjacent characters in which at least one non-initial character is capitalized, "BumpyCase" formatted words consisting of patterns of two or more proper case words (initial letter capitalized), formed in sets of adjacent characters, and concatenated together, or some other specific format. Accordingly, the disclosed system may embody what are conventionally referred to as "wiki" capabilities within the status message defined through the field 612, allowing for Web page creation and linking via "BumpyCase" format words. Web pages created by the disclosed system and linked through the status message may, for example, be user editable Web pages that allow editing by users through Web browser programs, and generally referred to as "wikis". Such functionality may be provided in cooperation with conventional "wiki" server software executing on one or more remote server systems.

Upon detection of a user entering a character string having the predetermined capitalization format into the field 612, the system makes that string into a "hot" link, creating an entry that is not displayed in the same display area as the status message, but through a Web browser application instead. The user making the entry may then be provided with a form interface that allows them to add the Web page associated with the link, or edit that Web page.

While the display 610 is shown with options for an owning user of the status message, users other than the owner of the status message may similarly be provided with a similar interface for providing entries into the status message, provided that such entries are permitted by the owning user.

Figure 27:
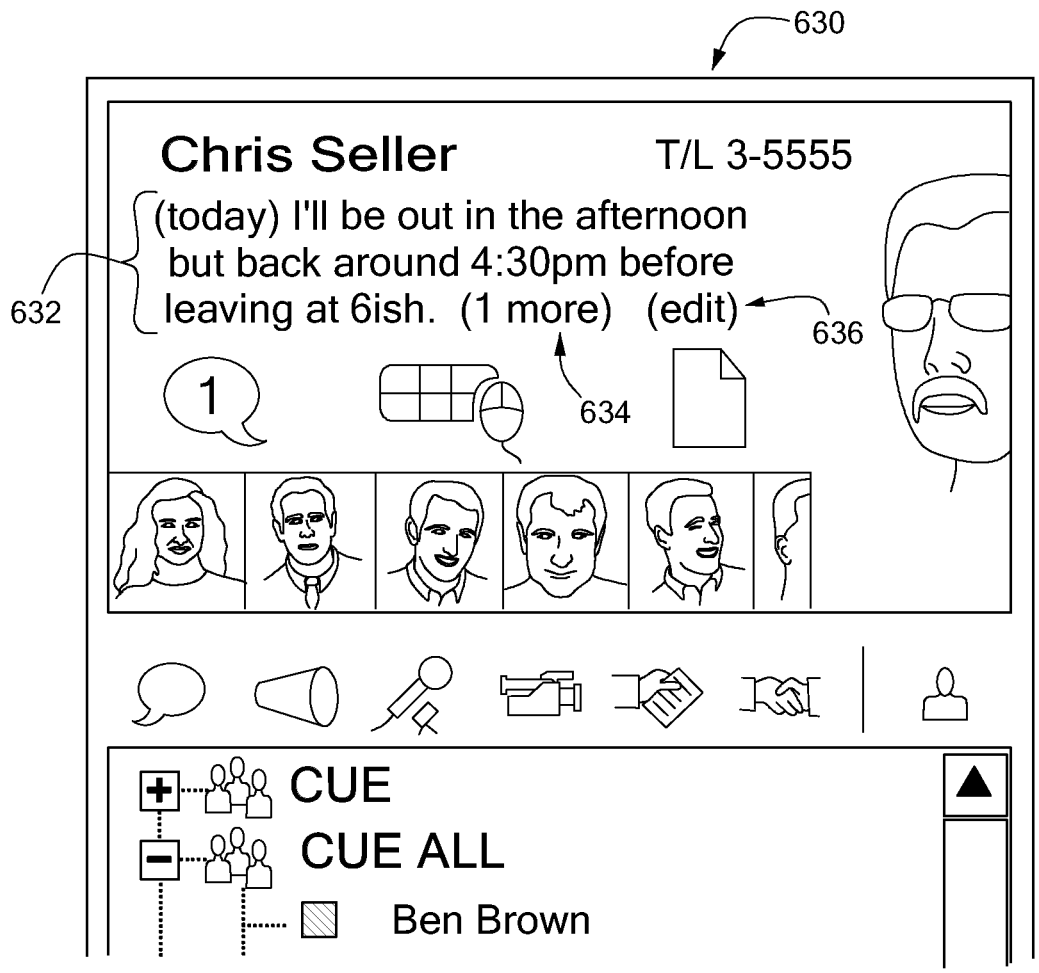
FIG. 27 shows an example of a user display containing a status message including an illustrative entry, as well as an interface for viewing other entries and editing one or more entries.

FIG. 27 shows an example of a user display 630 containing a status message including an illustrative entry 630, as well as an interface 634 for viewing other entries, and an interface 636 for editing one or more entries. For purposes of illustration, the user display 630 is shown including a clickable portion 634 for accessing other entries in the status message for the associated user. In this case, the clickable portion 634 itself includes text ("1 more") indicating the number of other entries in the status message in the display 630. The clickable portion 636 includes the text "(edit)", indicating to the user that the current entry in the status message in the display 630 can be edited through the clickable portion 636. The indication 637 provides information about when the associated entry in the status message was created. In the example of FIG. 27, the indication 637 includes the text "(today)", indicating that the entry with which the indication 637 is provided was created on the day it is being viewed. Other information regarding an entry within a status message may also be provided, including the specific time the entry was created, an indication of the user that created the entry, and other information. Additionally, each entry in the status message may include links to Web pages. Such links may be indicated by character strings having a predetermined capitalization formats, as described above. Moreover, while only one entry is shown in the status message shown in FIG. 27, the disclosed system may be embodied and/or configured such that multiple entries are simultaneously shown in the status message.

The above description of the preferred embodiments includes flowchart illustrations of methods, apparatus (systems) and computer program products according to an embodiment of the invention. Those skilled in the art will recognize that the specific orders of steps shown in the flow charts are given purely for purposes of illustration, and that the actual order in which the described operations are performed may vary between embodiments, configurations, or based on specific operational conditions. It will be further understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Similarly, the above description of the preferred embodiments includes examples of user interface display objects for purposes of explanation. The present invention is not limited to the specific screen layouts, icon shapes, or other specific aspects of the exemplary display objects in the figures, and may be embodied using a variety of specific display objects, icon designs, and/or user interface designs.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

Finally, while the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A computer-implemented method for providing a local computer user with detailed activity information regarding instant messaging sessions of remote users, comprising:
   receiving, by an awareness client application process executing on a local computer system from a remote awareness server application, an activity level associated with at least one instant messaging session associated with a user of a remote computer system; and
   presenting, by said awareness client application process, said activity level associated with said at least one instant messaging session associated with said user of said remote computer system in a display for said local computer system,
   wherein said received activity level is a time at which a most recent text message was received by said user of said remote computer system in said at least one instant messaging session, and
   wherein said received activity level further includes activities with other users of other remote computer systems.

2. The method of claim 1, further comprising:
   receiving, by said awareness client application process from said remote awareness server application, an identity of at least one other participant in at least one of said instant messaging sessions associated with said user of said remote computer system; and
   presenting, by said awareness client application process, said identity of said at least one other participant in said display for said local computer system.

3. The method of claim 1, wherein said presenting said activity level associated with said at least one instant messaging session associated with said user of said remote computer system comprises presenting a modal dialog box in response to detection of a request by a user of said local computer system for an instant messaging session with said user of said remote computer system, wherein said modal dialog box provides an interface for said user of said local computer system to provide an indication of whether to terminate said request for said instant messaging session with said user of said remote computer system.

4. The method of claim 1, further comprising:
   presenting an interface to said user of said local computer system, wherein said interface enables said user of said local computer system to indicate whether an activity level associated with at least one instant messaging session associated with said user of said local computer system is to be shared with other users.

5. The method of claim 1, further comprising:
   presenting an interface to said user of said local computer system, wherein said interface enables said user of said local computer system to specify one or more other users with which an activity level associated with at least one instant messaging session associated with said user of said local computer system is to be shared.

6. The method of claim 1, further comprising:
displaying, by said awareness client application process, information indicating which participant initiated each of said instant messaging sessions associated with said user of said remote computer system in said display for said local computer system.

7. The method of claim 1, further comprising:
receiving, by said awareness client application process executing on said local computer system from said remote awareness server application, a number of instant messaging sessions associated with said user of said remote computer system, wherein said number of instant messaging sessions associated with said user of said remote computer system comprises a total number of display windows currently open for instant messaging sessions on said remote computer system, and wherein said number of instant messaging sessions associated with said user of said remote computer system; and
presenting said number of instant messaging sessions associated with said remote user and said activity level associated with said at least one of said of instant messaging sessions associated with said remote user simultaneously in said display for said local computer system.

8. A system comprising:
at least one non-transitory computer readable storage medium, said non-transitory computer readable storage medium having computer-executable program code stored thereon for providing a local computer user with detailed activity level information regarding instant messaging sessions of remote users, said program code comprising:
program code for receiving, by an awareness client application process executing on a local computer system from a remote awareness server application, a number of instant messaging sessions associated with a user of a remote computer system, wherein said number of instant messaging sessions associated with said user of said remote computer system is a total number of display windows currently open for instant messaging sessions on said remote computer system, and wherein said number of instant messaging sessions associated with said user of said remote computer system is a plurality of instant messaging sessions, and
program code for presenting, by said awareness client application process, responsive to said local computer system user selecting said remote computer system user, said number of instant messaging sessions associated with said user of said remote computer system in a display for said local computer system,
wherein said activity level is a time at which said at least one instant messaging session was initiated, and
wherein said activity level further includes activities between the user of the remote computer system with other users of other remote computer systems.

9. The system of claim 8, said program code further comprising:
program code for receiving, by said awareness client application process from said remote awareness server application, an identity of at least one other participant in at least one of said instant messaging sessions associated with said user of said remote computer system; and
program code for presenting, by said awareness client application process, said identity of said at least one other participant in said display for said local computer system.

10. The system of claim 8, wherein said program code for presenting said activity level associated with said at least one instant messaging session associated with said user of said remote computer system comprises program code for presenting a modal dialog box in response to detection of a request by a user of said local computer system for an instant messaging session with said user of said remote computer system, wherein said modal dialog box provides an interface for said user of said local computer system to provide an indication of whether to terminate said request for said instant messaging session with said user of said remote computer system.

11. The system of claim 8, said program code further comprising:
program code for presenting an interface to said user of said local computer system, wherein said interface enables said user of said local computer system to indicate whether an activity level associated with at least one instant messaging session associated with said user of said local computer system is to be shared with other users.

12. The system of claim 8, said program code further comprising:
program code for presenting an interface to said user of said local computer system, wherein said interface enables said user of said local computer system to specify one or more other users with which an activity level associated with at least one instant messaging session associated with said user of said local computer system is to be shared.

13. The system of claim 8, said program code further comprising:
program code for displaying, by said awareness client application process, information indicating which participant initiated each of said instant messaging sessions associated with said user of said remote computer system in said display for said local computer system.

14. A computer program product comprising:
a non-transitory computer readable storage medium, said non-transitory computer readable storage medium having computer-executable program code stored thereon for providing a local computer user with detailed activity level information regarding instant messaging sessions of remote users, said program code comprising:
program code for receiving, by an awareness client application process executing on a local computer system from a remote awareness server application, a number of instant messaging sessions associated with a user of a remote computer system, wherein said number of instant messaging sessions associated with said user of said remote computer system is a total number of display windows currently open for instant messaging sessions on said remote computer system, and wherein said number of instant messaging sessions associated with said user of said remote computer system is a plurality of instant messaging sessions, and
program code for presenting, by said awareness client application process, responsive to said local computer system user selecting said remote computer system user, said number of instant messaging sessions associated with said user of said remote computer system in a display for said local computer system, wherein said activity level is a time at which a most recent keystroke was entered by said user of said remote computer system in said at least one of said instant messaging session, and wherein said activity level further includes activities between the user of the remote computer system with other users of other remote computer systems.

* * * * *